(12) United States Patent
Chen et al.

(10) Patent No.: US 11,461,442 B2
(45) Date of Patent: Oct. 4, 2022

(54) SYSTEMS AND METHODS FOR USER INPUT AND AUTHENTICATION USING VIBRATION ANALYSIS

(71) Applicants: Rutgers, The State University of New Jersey, New Brunswick, NJ (US); The UAB Research Foundation, Birmingham, AL (US)

(72) Inventors: Yingying Chen, Morganville, NJ (US); Jian Liu, Highland Park, NJ (US); Chen Wang, North Bergen, NJ (US); Nitesh Saxena, Hoover, AL (US)

(73) Assignees: Rutgers, The State University of New Jersey, New Brunswick, NJ (US); The UAB Research Foundation, Birmingham, AL (US)

( * ) Notice: Subject to any disclaimer, the term of this patent is extended or adjusted under 35 U.S.C. 154(b) by 220 days.

(21) Appl. No.: 16/432,558

(22) Filed: Jun. 5, 2019

(65) Prior Publication Data

US 2019/0384898 A1 Dec. 19, 2019

Related U.S. Application Data

(60) Provisional application No. 62/680,970, filed on Jun. 5, 2018.

(51) Int. Cl.
*G06F 21/31* (2013.01)
*G06F 3/01* (2006.01)

(52) U.S. Cl.
CPC ............ *G06F 21/316* (2013.01); *G06F 3/016* (2013.01); *G06F 3/017* (2013.01)

(58) Field of Classification Search
CPC ......... G06F 21/316; G06F 3/016; G06F 3/017
(Continued)

(56) References Cited

U.S. PATENT DOCUMENTS

| 4,790,013 A | * | 12/1988 | Kage | ....................... H04L 7/046 375/365 |
| 9,329,715 B2 | | 5/2016 | Schwarz et al. | |

(Continued)

FOREIGN PATENT DOCUMENTS

| EP | 1310860 A1 | 5/2003 |
| EP | 1794668 A2 | 6/2007 |

(Continued)

OTHER PUBLICATIONS

Liu et al., VibWrite: Towards Finger-input Authentication on Ubiquitous Surfaces via Physical Vibration, http://www.winlab.rutgers.edu/~yychen/papers/vibwrite.pdf (Year: 2017).*

(Continued)

*Primary Examiner* — Jacob Lipman
(74) *Attorney, Agent, or Firm* — McCarter & English, LLP

(57) ABSTRACT

A user input system comprising a vibration motor, a sensor and a processor in communication with the sensor. The vibration motor is in contact with a surface and generates vibrations in the surface. The vibrations can be altered by a user touching the surface to create altered vibrations. The sensor is in contact with the surface and detects the altered vibrations. The processor receives and analyzes data corresponding to the altered vibrations. The processor determines, based on the analyzed data, whether a user's touch on the surface matches a stored vibration profile of the user.

29 Claims, 22 Drawing Sheets
(3 of 22 Drawing Sheet(s) Filed in Color)

(58) Field of Classification Search
USPC .......................................................... 726/17
See application file for complete search history.

(56) References Cited

U.S. PATENT DOCUMENTS

| | | | | |
|---|---|---|---|---|
| 2005/0044053 A1* | 2/2005 | Moreno | ............... | G06K 9/6226 |
| | | | | 706/20 |
| 2012/0019361 A1* | 1/2012 | Ben Ayed | ............... | G06F 21/32 |
| | | | | 340/5.83 |
| 2014/0169795 A1* | 6/2014 | Clough | ................ | H04W 88/02 |
| | | | | 398/106 |
| 2014/0331313 A1 | 11/2014 | Kim et al. | | |
| 2017/0294192 A1* | 10/2017 | Bradley | .................. | G10L 25/51 |
| 2018/0267673 A1* | 9/2018 | Kim | ....................... | G06F 3/0433 |
| 2019/0245851 A1* | 8/2019 | Whaley | .................. | G06N 20/00 |

FOREIGN PATENT DOCUMENTS

| | | | |
|---|---|---|---|
| JP | 2011044029 A | * | 3/2011 |
| KR | 20080050169 A | | 6/2008 |
| KR | 100978913 B1 | * | 8/2010 |

OTHER PUBLICATIONS

Loughran, Finger vibrations used to make any hard surface a biometric security device, https://eandt.theiet.org/content/articles/2017/10/finger-vibrations-used-to-make-any-hard-surface-a-biometric-security-device/ (Year: 2017).*

* cited by examiner

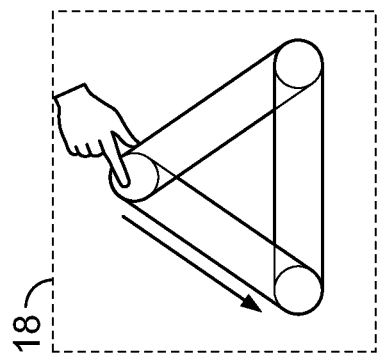
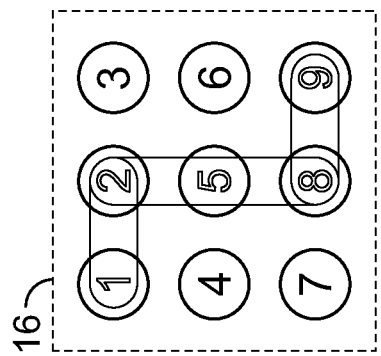
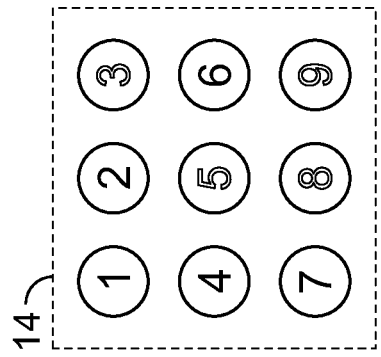
FIG. 2

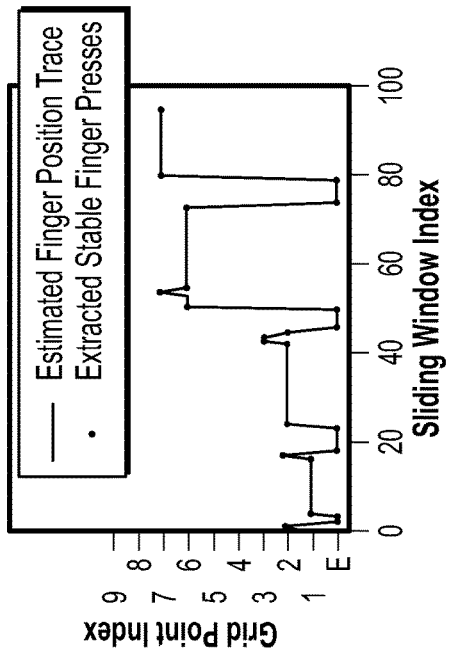

(a) User Presses a PIN Sequence "1267" and Swipes a Lock Pattern "1-2-5-9" on a 3 X 3 Grid

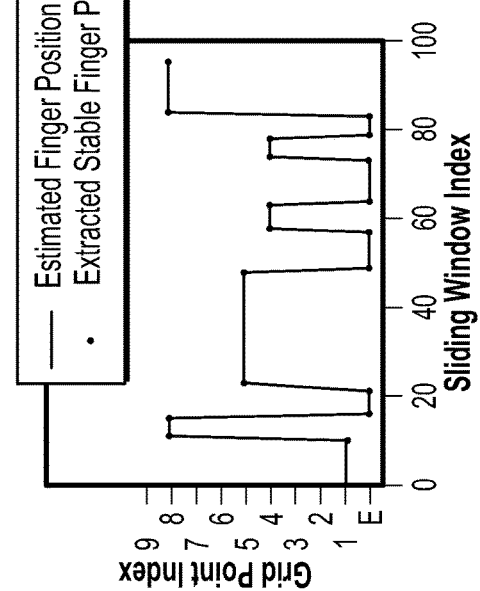

(b) Estimated Finger Position Trace in Terms of Grid Point Index When the User Enters the PIN Sequence "1267"

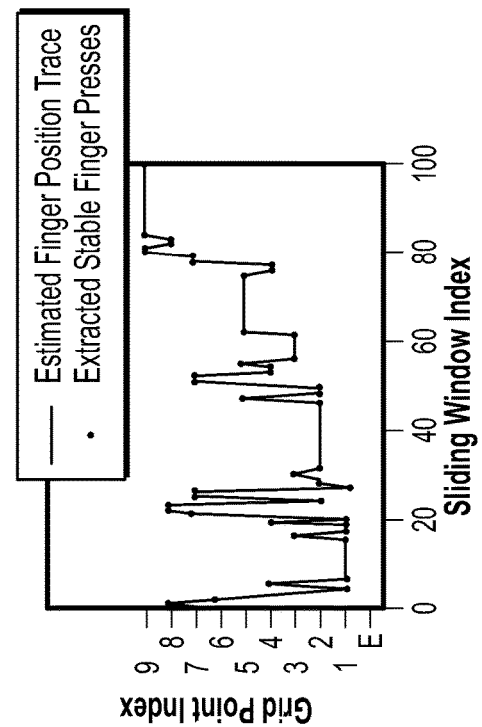

(d) Example of an Attacker Entering the Legitimate User's PIN Sequence "1267" or the Same Grid of the Same Desk Surface.

(b) Estimated Finger Position Trace in Terms of Grid Point Index When the User Swipes the Lock Pattern "1-2-5-9"

FIG. 12

SYSTEMS AND METHODS FOR USER INPUT AND AUTHENTICATION USING VIBRATION ANALYSIS

RELATED APPLICATIONS

This application claims priority to U.S. Provisional Patent Application Ser. No. 62/680,970 filed on Jun. 5, 2018, the entire disclosure of which is hereby expressly incorporated by reference.

GOVERNMENT SUPPORT

This invention was made with government support under CNS-1514436, CNS-1716500, and CNS-1526524 awarded by the National Science Foundation. The government has certain rights in the invention

BACKGROUND

Technical Field

The present disclosure relates generally to the field of authentication. More particularly, the present disclosure relates to systems and methods for user input and authentication using vibration analysis.

Related Art

The process of authentication for verifying a user's identity is frequently utilized in everyday life. Further, the increasingly wide deployment of smart access systems, such as those used for keyless access control for corporate facilities, apartment buildings, hotel rooms, smart homes, vehicle doors, etc. requires the authentication process to play a broader role in numerous daily activities beyond the common types of authentication used on devices, such as mobile phones. The classic physical-key-based access methods do not possess user authentication functionality. The current authentication process in smart security access systems mainly relies on traditional solutions supported by intercom, camera, card, or fingerprint-based techniques. These approaches, however, involve expensive equipment, complex hardware installation, and diverse maintenance needs. The trend of employing low-cost, low-power tangible user interfaces (TUI) to support user authentication in various facility entrances, apartment doors, and vehicles has gained industry attention recently. For example, token devices (e.g., smart rings, gloves, or pens) could be utilized for associating identities to touch interactions, and an ultra-thin sensing pad can be deployed in automobiles to perform driver authentication. Moreover, isometric buttons appearing on new models of microwave ovens and stove tops and rotary inputs (e.g., used by The Apple iPod) can replace the regular physical buttons to provide better functionality and flexibility. However, these techniques require that the touched surface possesses electric conductivity and an electric field that produces/stores electrical energy, which largely limits the wide deployment of such solutions.

The convenience of executing user authentication via touching any surface is needed and does not currently exist in the art. For instance, it would be desirable for a driver to place his/her palm against the driver-side window to access and start the vehicle. Also, it would be desirable for a user to place his/her hand on the door panel of his apartment to perform authentication and unlock the entrance door without card access. Further, electronic appliances in smart homes have a growing need to provide customized services for advanced safety needs such as prohibiting children and elderly people from operating risky appliances (e.g., oven and dryer), adjusting room temperature/lighting conditions, and recommending TV content. A low-cost solution of tangible user authentication enabled on any solid surface could eliminate the need of installing touch screens on such electronic devices, and making the customized services easy to deploy.

Traditional authentication solutions are based on passwords (i.e., texts and graphical patterns), which have a number of issues. For example, because these approaches are based on the knowledge of the passwords, they suffer from password theft or shoulder surfing. Moreover, to ensure that a user's password cannot be easily guessed, the user has to memorize long strings of random characters, making it inconvenient. Graphical passwords are proposed to ease the memory burden by letting users choose their preselected images from random choices of pictures or Cued Clicked Points (CCP) in a sequence of images. Additionally, grid lock pattern-based approaches have been widely adopted to keep the user's mobile devices protected. Recent graphical authentication methods can resist shoulder surfing attacks by utilizing the Convex Hull Click Scheme or the eye-gaze version of CCP. However, these strategies eventually perform the authentication-based on the knowledge of the passwords (e.g., text-based, image-based and lock pattern-based) and cannot tell whether the password is entered by a legitimate user.

Other types of authentication involve physiological biometrics (e.g., fingerprints, iris patterns, and facial features). These mechanisms are less likely to suffer from identity theft. However, they usually require installation of expensive equipment and stir privacy concerns of the users. To reduce the privacy concerns, a compromised approach is to authenticate users based on their behavioral characteristics, including unique keystroke dynamic, mouse movements, and gait patterns. Although these approaches are less sensitive in terms of privacy, they are designed for continuous user verification during the period that the user operates the keyboard, moves a mouse or takes a walk, rather than one-time authentication.

Further, some solutions allow users to rely on familiar biometric-associated features (e.g., a sequence of 2D handwriting and corresponding pressure) extracted from mobile device touch screens, instead of tedious passwords for user authentication. These approaches rely on touch screens, and are hard to extend general security access systems such as accessing corporate facilities, apartment buildings, and smart homes when touch screens are not always available. In addition, oily residues, or smudges, on the touch screen surface may be used to recover user's graphical password (i.e., smudge attacks).

Therefore, in view of existing technology in this field, what would be desirable is a general user authentication solution with smart access capability that can work with any solid surface (such as a door, a table or a vehicle's window), is not limited to touch screens, and can be implemented with minimum hardware and maintenance cost.

SUMMARY

The present disclosure relates to systems and methods for user input and authentication using vibration analysis. In particular, the systems and methods of the present disclosure extend finger-input authentication beyond touch screens to any solid surface for smart access systems (e.g., access to apartments, vehicles, smart appliances, etc.). It integrates passcode, behavioral, and physiological characteristics, and surface dependency together to provide a low-cost, tangible, and enhanced security solution. It also builds upon a touch sensing technique with vibration signals that can operate on surfaces constructed from a broad range of materials. It significantly differs from traditional password-based approaches, which only authenticate the password itself rather than identifying a legitimate user, as well as the behavioral biometrics-based solutions which usually involve specific or expensive hardware (e.g., touch screen or fingerprint reader), and which incur privacy concerns and suffer from smudge attacks. The systems and methods of the present disclosure discriminate fine-grained finger inputs and support a plurality of independent passcode secrets including, but not limited to, PIN number, lock pattern, and simple gestures by extracting unique features in the frequency domain to capture both behavioral and physiological characteristics such as contacting area, touching force, etc. The systems and methods of the present disclosure can be implemented using a single pair of a low-cost vibration motor and a receiver that can be easily attached to any surface (e.g., a door panel, a desk or an appliance). Experiments demonstrate that the systems and methods of the present disclosure can authenticate users with high accuracy (e.g., over 95% within two trials), low false positive rate (e.g., less 3%), robustness to various types of attacks.

The present disclosure provides a user input system which includes a vibration motor in contact with a surface and generating vibrations in the surface. The vibrations can be altered by a user touching the surface to create altered vibrations. The user input system also includes a sensor in contact with the surface which also detects the altered vibrations in the surface. The user input system also includes a processor in communication with the sensor where the processor receives and analyzes data corresponding to the altered vibrations to determine whether a user's touch on the surface matches a stored vibration profile of the user.

The present disclosure also provides a method of determining a user input. The method includes the step of generating a vibration in a surface and altering the vibration by touching the surface to create an altered vibration. The method also includes the step of obtaining vibration data with a sensor, the vibration data corresponding to the altered vibration. The method also includes the step of analyzing the vibration data to determine whether a user's touch on the surface matches a stored vibration profile of the user.

Still further, the present disclosure provides a user input system which includes a vibration motor in contact with a surface and generating vibrations in the surface. The vibrations can be altered by a user touching the surface to create altered vibrations. The user input system also includes a sensor in contact with the surface which also detects the altered vibrations in the surface. The user input system also includes a processor in communication with the sensor where the processor receives and analyzes data corresponding to the altered vibrations to determine a location of a user's touch on the surface.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing features of the invention will be apparent from the following Detailed Description, taken in connection with the accompanying drawings, in which:

FIG. 2 illustrates different types of inputs for allowing a user to gain access to a secure area via authentication;

FIG. 12 includes a diagram illustrating a user's PIN sequence/lock pattern-based authentication on a solid surface, as well as graphs showing various finger traces;

DETAILED DESCRIPTION

The present disclosure relates to systems and methods for user input and authentication using vibration analysis, as discussed in detail below in connection with FIGS. 1-23.

The systems and methods of the present disclosure provide an authentication system having a low-cost, low-power tangible user interface, which has the flexibility to be deployed on ubiquitous surfaces. It leverages physical vibration to support authentication to emerging smart access security systems. To enable touching and writing on any surface during the authentication process, the systems and methods utilize a touch sensing technique using vibrations that is robust to environmental noise and can operate on surfaces constructed from a broad range of materials.

Figure 1:
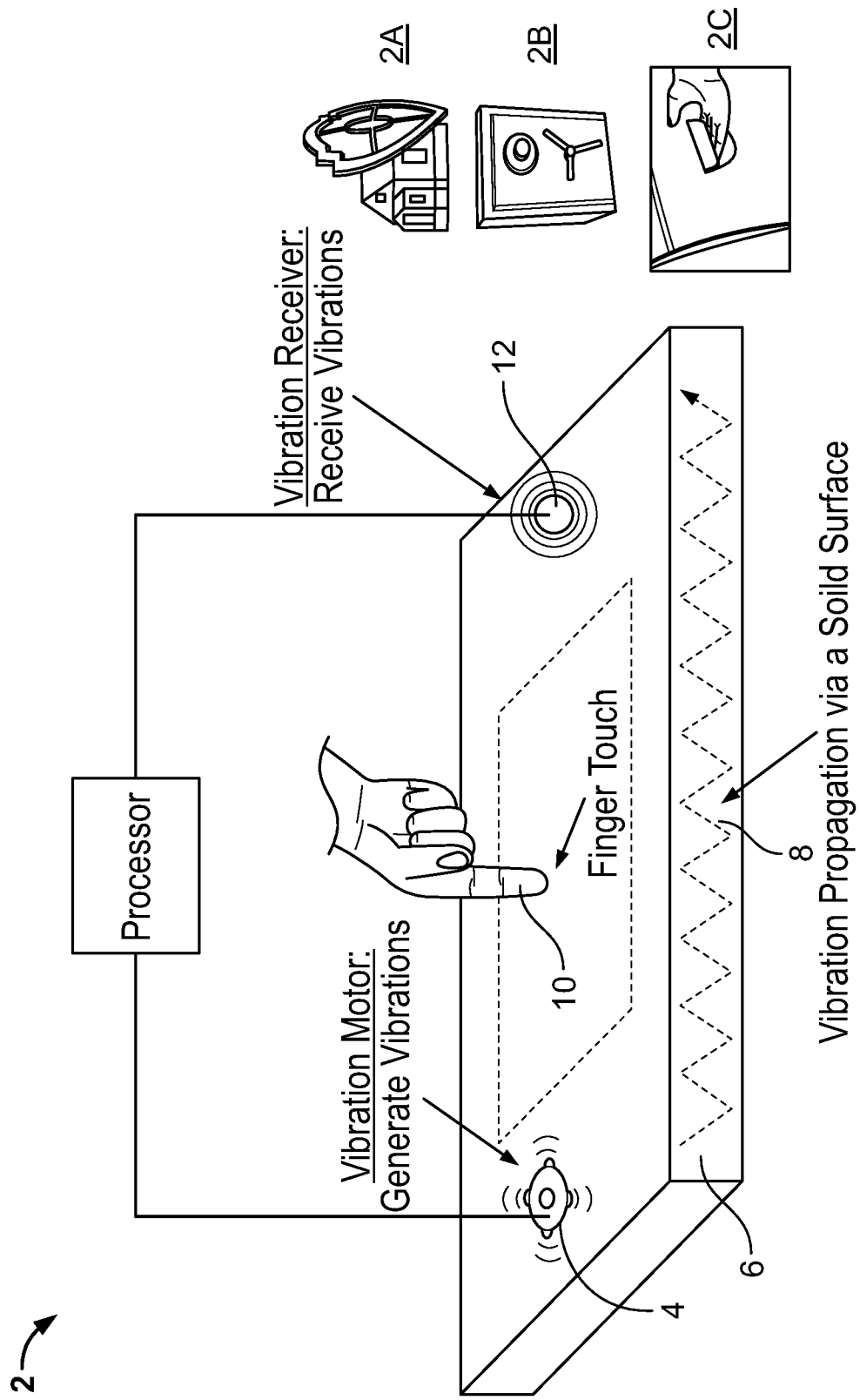
FIG. 1 is a diagram illustrating the user input system of the present disclosure.

FIG. 1 is a drawing illustrating an example user input system 2 of the present disclosure. As shown in FIG. 1, a vibration motor 4 actively excites a surface 6 resulting in a shockwave propagation 8. The presence of an object or finger 10 touching the surface can be sensed by analyzing the vibrations received by a sensor 12. It should be noted that although one sensor 12 is shown, multiple sensors can be used to improve accuracy of the systems and methods. Alternatively, an amplifier can be used to increase the size of the input area. The systems and methods of the present disclosure support generalized vibration sensing based on a low-cost, single-sensor prototype that can be attached to solid surfaces (such as a door, a table or an appliance) and sense user touches and perform authentication flexibly from anywhere. By relying on the vibration signals in a relatively high frequency band (i.e., over 16 kHz), the system is hardly audible or distracting to the user, and is less susceptible to environmental interference from acoustic (i.e., mainly within a lower frequency band) or radiofrequency noise. In some situations, vibration propagation can be dependent on the surface material and shape. Accordingly, the systems and methods of the present disclosure can provide enhanced security by integrating location/surface uniqueness through such low-cost and tangible vibration-based user interface. As another example, the vibration response of an office door can be different from that of a house door 2A or a safe 2B or a car door 2C. The unique behavioral information can be embedded in both the behavioral biometrics, as well as the surface being touched (e.g., the specific door in the office), making the system more secure against attackers.

FIG. 2 illustrates different forms of secrets for allowing a user to gain access to a secure area via authentication. In particular, the systems and methods of the present disclosure can allow a user to enter a personal identification number ("PIN") 14 on the surface 6. Further, the systems and methods of the present disclosure can allow a user to enter a lock pattern 16 on the surface 6. Also, the systems and methods of the present disclosure can allow a user to enter a gesture 18 on the surface 6. Still further, the systems and methods of the present disclosure can allow a user to enter a signature on the surface 6. The authentication process can occur on any solid surface. It is resilient to side channel attacks when an adversary places a hidden vibration receiver on the authenticating surface or a nearby microphone to capture the received vibration signals. It is also robust to various adversarial activities, including the seemingly very powerful ones that observe the legitimate user's input multiple times and are aware of the passcode secret. It can authenticate the legitimate user and reject attacks well because of the following insights: 1) vibration signals have the capability to perform location discrimination on a centimeter scale; and 2) unique features are embedded in a user's finger pressing at different locations on a solid surface. Such unique features reflect the characteristics of the user's finger touching on the medium (e.g., a door panel or a desk surface) including locations of touching, contacting area, touching force, and etc., making them capable to discriminate different touching locations of the same user and different users when touching on the same location. Thus, the systems and methods of the present disclosure allow users to finger-input (i.e., touch or write) on solid surfaces, and are robust to passcode theft or passcode cracking by integrating 1) passcode, 2) behavioral and physiological characteristics (e.g., touching force and contacting area), and 3) surface dependency (e.g., house door or office desk) together to provide enhanced security.

The systems and methods of the present disclosure provide a vibration-signal-based finger-input authentication system, which can be deployed on any solid surface for smart access systems (e.g., apartment entrances, car doors, electronic appliances and corporate desks). Authentication captures intrinsic human physical characteristics presenting at specific location/surface for authentication through extracting unique features (e.g., frequency response and cepstral coefficient) in the frequency domain. As noted above, the systems and methods have the flexibility to support three types of secrets (i.e., PIN, lock pattern, and gesture) to meet different application requirements by developing new techniques of virtual grid point derivation, featured-based dynamic time warping (DTW), and distribution analysis-based on earth mover's distance (EMD). Other types of secrets or user inputs can be used in the system of the present disclosure. Indeed, any type of user input that can be received by a surface can be used. Moreover, the systems and methods are implemented using a single pair of low-cost vibration motor and receiver, which involves minimum hardware installation and maintenance.

Physical vibration is a mechanical phenomenon, which creates a mechanical wave transferring the initial energy through a medium. Similar to the transmission of wireless signals, when a vibration signal travels through a medium, it experiences attenuation along the propagation path and reflection/diffraction when the signal hits the boundary of two different media (e.g., the contacting area between a finger and a medium).

Figure 3:
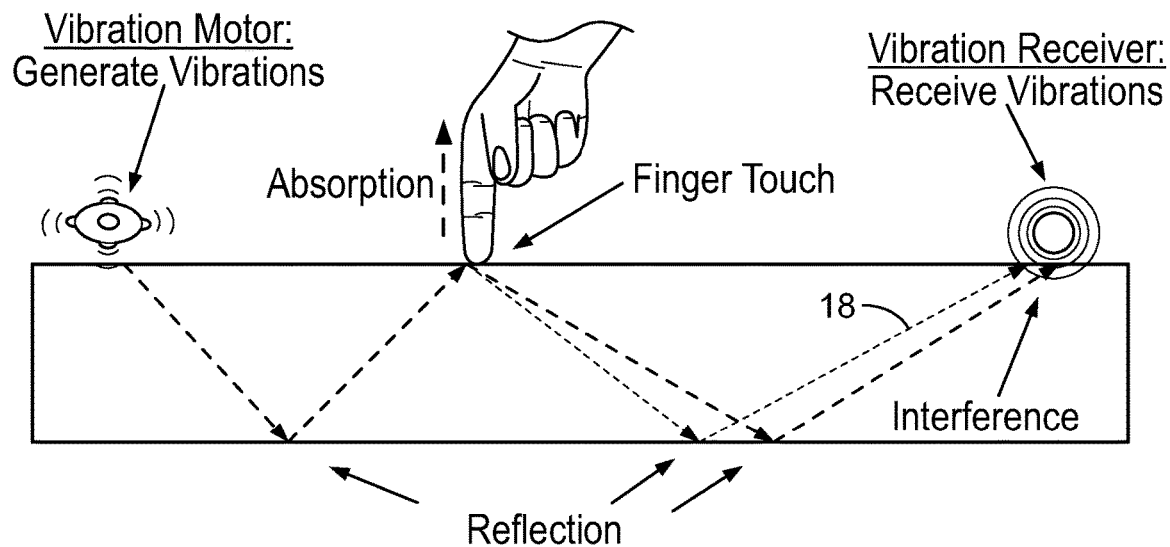
FIG. 3 illustrates reflection and diffraction of a vibration signal propagating in a solid surface when a finger touches the area between the vibration signal generator and receiver.

FIG. 3 illustrates the reflection and diffraction of a vibration signal propagating in a solid surface when a finger touches the area in between the vibration signal generator and receiver. When the vibration signal hits the contacting area of the finger, part of the signal reflects back to the surface, and the rest of it propagates into the finger (i.e., absorption) and bounces back to the surface along a different propagation path 20. The vibration signal is therefore affected by the touching location of the finger, and traverses different paths before reaching the receiver (i.e., vibration sensor). This can be thought of as an altered vibration signal due to the touching on the surface. Thus, the touching location information is embedded in the various interference effects captured at the receiver. Further, when a finger touches the surface of an object (e.g., a table), the flexibility of the object is affected not only by the touching location but also the strength of touch. These properties can be utilized to enable a commodity phone to recognize the force applied to its phone body and screen.

Figure 4:
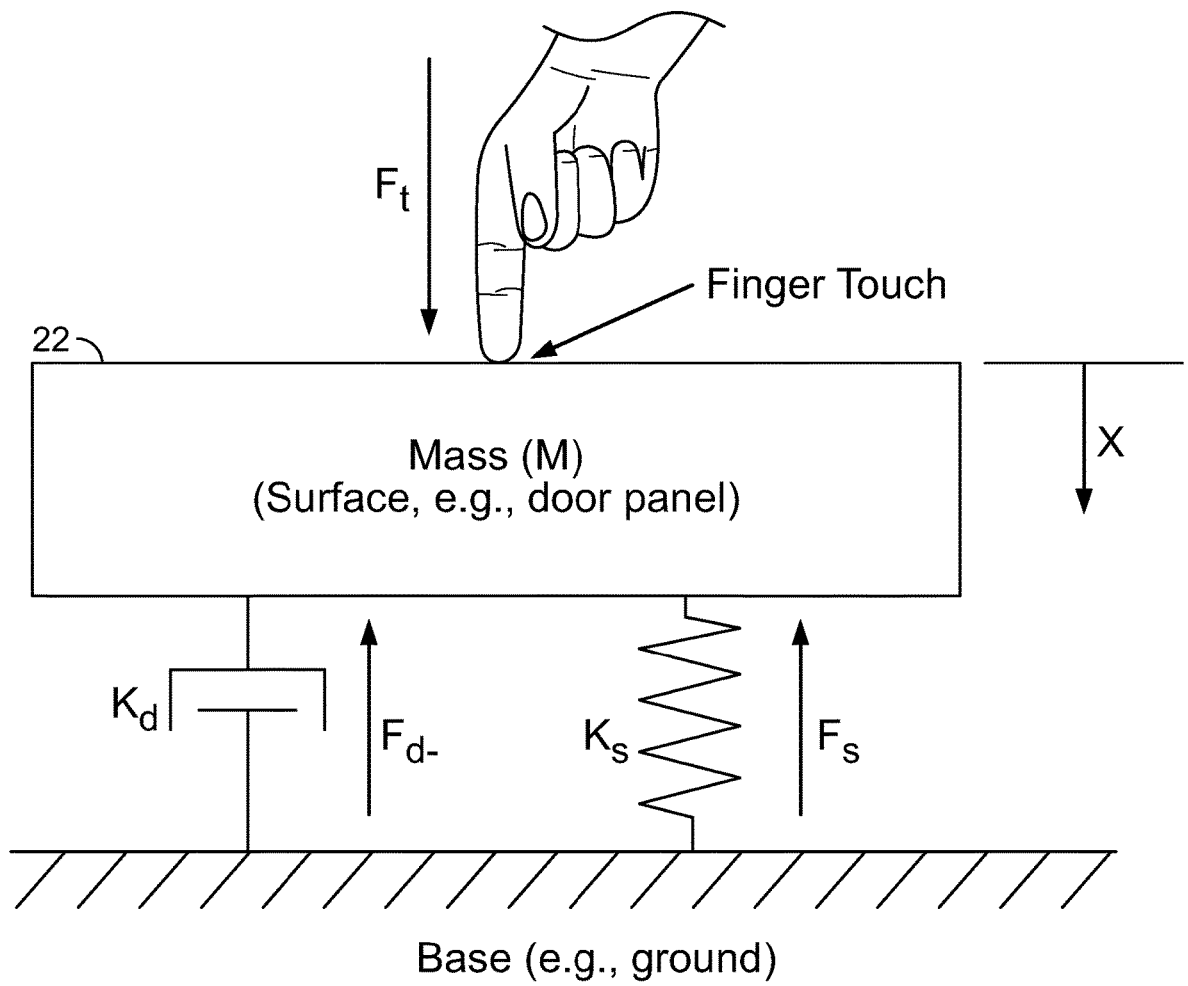
FIG. 4 is a drawing illustrating analysis of a user's touch using a spring-mass-damper system.

FIG. 4 is a drawing illustrating a spring-mass-damper system, which can be used to mathematically model the vibration effect on an object under an external force caused by the finger touch. A free-body diagram with the mass M represents a vibrating surface 22, while the external force $F_t$ is caused by the finger touch. Moreover, the vertical shaft has an effective spring constant of $K_s$ and a damping coefficient of $K_d$. When the surface 22 has a vertical displacement of x, the equation can be written as follows:

$$Ft = K_d\left(\frac{d}{dt}\right)x + K_s x + M\left(\frac{d}{dt}\right)^2 x.$$

To satisfy the equilibrium condition, the vertical displacement x is dependent on the external force $F_t$. This indicates that the finger touching force could be captured by analyzing the received vibration signals and utilized as a biometric-associated feature in systems and methods of the present disclosure. Note that the above analysis also works on vertical planar surface (e.g., door panel) as the equilibrium condition could be analyzed along the direction perpendicular to the surface.

The vibration energy absorbed into the human finger-hand-arm system is different under different vibration frequencies. The frequency response of the same user finger-press presents higher correlation than that of different users when they touch the same location on a surface. This important observation suggests that the vibration propagation properties are strongly influenced by unique human physical traits such as contacting area, touching force and etc., which can assist ubiquitous user authentication together with passcode on any surface beyond touch screens.

The systems and methods of the present disclosure can eliminate a number of different attacks on an authentication system, which will be discussed in greater detail below. One type of attack is a blind attack in which an adversary randomly touches on the authentication surface equipped with the present system, hoping the random touching events can result in similar impacts to the vibration signals as the legitimate user does. Another type of attack is a credential-aware attack in which an adversary has the prior knowledge of the legitimate user's credentials, including the PIN number, lock pattern or personal gesture, but does not possess the knowledge of the present system's setting details such as the grid size, gesture region, and the authentication surface, which prevents such an attack from occurring. Yet another attack is a knowledgeable observer attack in which an adversary is capable of both observing the legitimate user's hand movements when he is passing the authentication system via shoulder surfing or video taping as well as knowing the user's credentials and present system setting details. In this scenario, the adversary tries to imitate the legitimate user's hand or finger movements based on his understanding of the user's credentials to pass the authentication. Another attack is a side-channel attack where an adversary makes an effort to hack the present system directly in the hope of capturing the similar vibration signals of the legitimate user by placing a hidden vibration receiver on the authentication surface or employing a microphone in a nearby location.

The systems and methods of the present disclosure analyze unique features from the received vibration signals to enable authentication on ubiquitous object surfaces such as entrances (e.g., apartment building or car doors) and smart home appliances (e.g., hot stove and dryer). The vibration motor can be triggered when a person moves closer to the security access area (e.g., a door panel) or surface, which can be easily achieved using low power proximity sensors or motion sensors.

Figure 5:
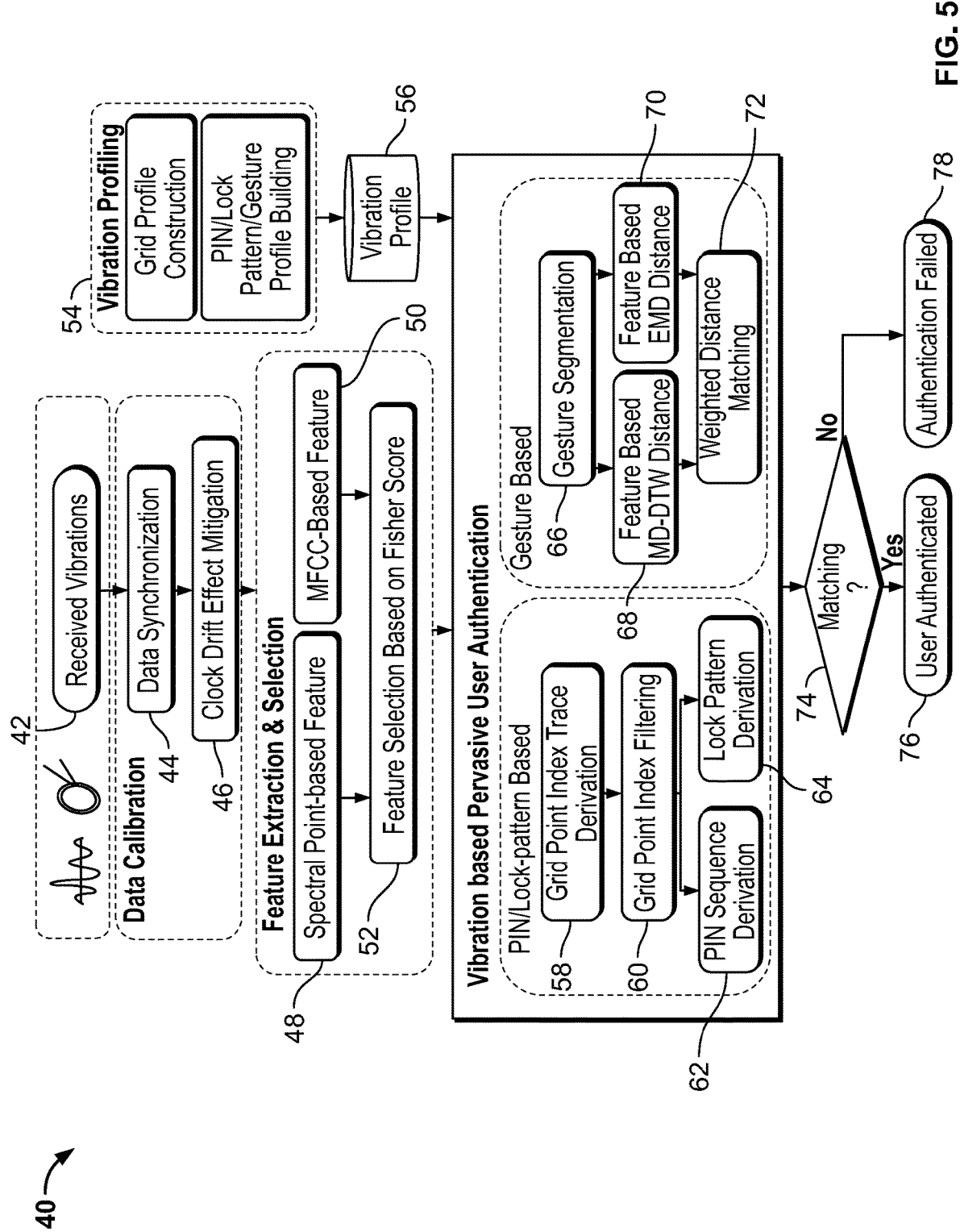
FIG. 5 is a flowchart illustrating processing steps carried out by the system for authenticating a user.

FIG. 5 is a flowchart illustrating processing steps 40 carried out by the system for authenticating a user. These steps can be carried out by a processor. In step 42, a vibration motor generates low-annoyance vibrations and the system receives vibrational signals from the vibration receiver. Then the system performs data calibration which includes step 44 for data synchronization and step 46 for clock drift effect mitigation. Steps 44 and 46 ensure the received vibration signals always synchronized and eliminate the effects caused by the clock drift (i.e., inconsistent sampling frequency). The systems and methods of the present disclosure will then extract and select vibration features in the frequency domain from the synchronized vibration signals within a sliding window. In particular, in step 48, Spectral Point-based Feature processing (i.e., frequency amplitude of each spectral point) can be used. Moreover in step 50, MFCC-based Feature (Mel-frequency cepstral coefficient) processing can be used. Steps 48 and 50 reflect the intrinsic physical traits embedded in the user's finger inputs. In step 52, the system further performs feature selection-based on the Fisher Score on top of the Spectral Point-based and MFCC-based features by selecting a subset of features exhibiting more discriminative power among different touching locations as well as maintaining feature consistency within each touching location. The extracted vibration features are used by two phases in systems and methods of the present disclosure: profiling and authentication. In both PIN number-based and lock pattern-based authentications, a grid can be shown or drawn on the touching surface. In the profiling phase of step 54, the features can be extracted and captured while a user first enrolls in the system and presses his finger at different grid points on the touching surface. These features are labeled and saved to build the user's profile 56 in grid profile construction. During the authentication phase, the received vibration signals are utilized to extract vibration features. The extracted features then serve as inputs to Grid Point Index Trace Derivation step 58 via a classifier based on Supporting Vector Machine (SVM) or Deep Neural Network (DNN) trained by the grid profiles. The classifier compares the extracted features with the stored ones in the profile to filter out the signal segments before and after the finger inputs and derive grid point trace containing finger touching inputs. The derived grid point trace is then input into Grid Point Index Filtering in step 60 to eliminate the incorrectly classified grid point indices and obtain the ones corresponding to the finger presses in the grid point index trace. Next, the filtered grid point trace is used in step 62 for PIN Sequence Derivation or in step 64 for Lock Pattern Derivation. The recovered PIN number/lock pattern is then compared with the local stored PIN/lock pattern information for the final authentication. Independently, the systems and methods of the present disclosure also enable the user to perform simple gestures (e.g., drawing a circle on the surface) for authentication without the restrictions of pressing/passing the grid points on the authentication surface. Contrary to fixed grids in PIN/lock pattern-based authentication, authentication using gestures provides more flexibility to a user. However, even for the same user, the same finger gesture could be slightly different at different authentication times due to the lack of consistency. Thus, the mechanism for gesture-based authentication can capture the intrinsic gesture behavior to deal with gesture inconsistency while preserving individual diversity. In particular, during the gesture-based authentication, the system can identify, in step 66, the signal segment containing the gesture operation via Gesture Segmentation. In the profiling phase in step 54, the extracted feature sequence (i.e., Spectral Point-based and MFCC-based features) from the gesture segments are saved to build the specific user's profile 56. To measure the similarity of generated features in the authentication phase to the gesture profiles, system addresses the gesture inconsistency problem by considering both time warped feature sequences and the distribution of the features. This is achieved by calculating both MDDTW (Multi-Dimensional Dynamic Time Warping) Distance in step 68 and EMD (Earth Mover Distance) in step 70 of the extracted feature sequences to the profiles. The weighted distance combination in Weighted Distance Matching step 72 obtains the combined distance from the two techniques. Finally, the systems and methods of the present disclosure can make a decision by checking a threshold to the calculated distances between input gestures and the stored profiles in step 74. If there is a match, the user is authenticated in step 76, and if there is not a match, access is denied in step 78.

The details of the vibration signal design will now be explained in greater detail. To facilitate finger-input-based user authentication via physical vibration, the vibration signals used in the system can contain a broad range of frequencies to increase the diversity of vibration features in the frequency domain. Specifically, the system can generate repeated chirp vibration signals to linearly sweep frequency from 16 kHz to 22 kHz, which are hardly audible to most human ears. Other suitable frequency ranges can be used in the system of the present disclosure. Additionally, such frequency range is much higher than the frequency range of ambient noise and the vibrations caused by human body (e.g., breathing and heart beating). This makes the system less possible to be interfered by these unrelated noises.

Figure 6:
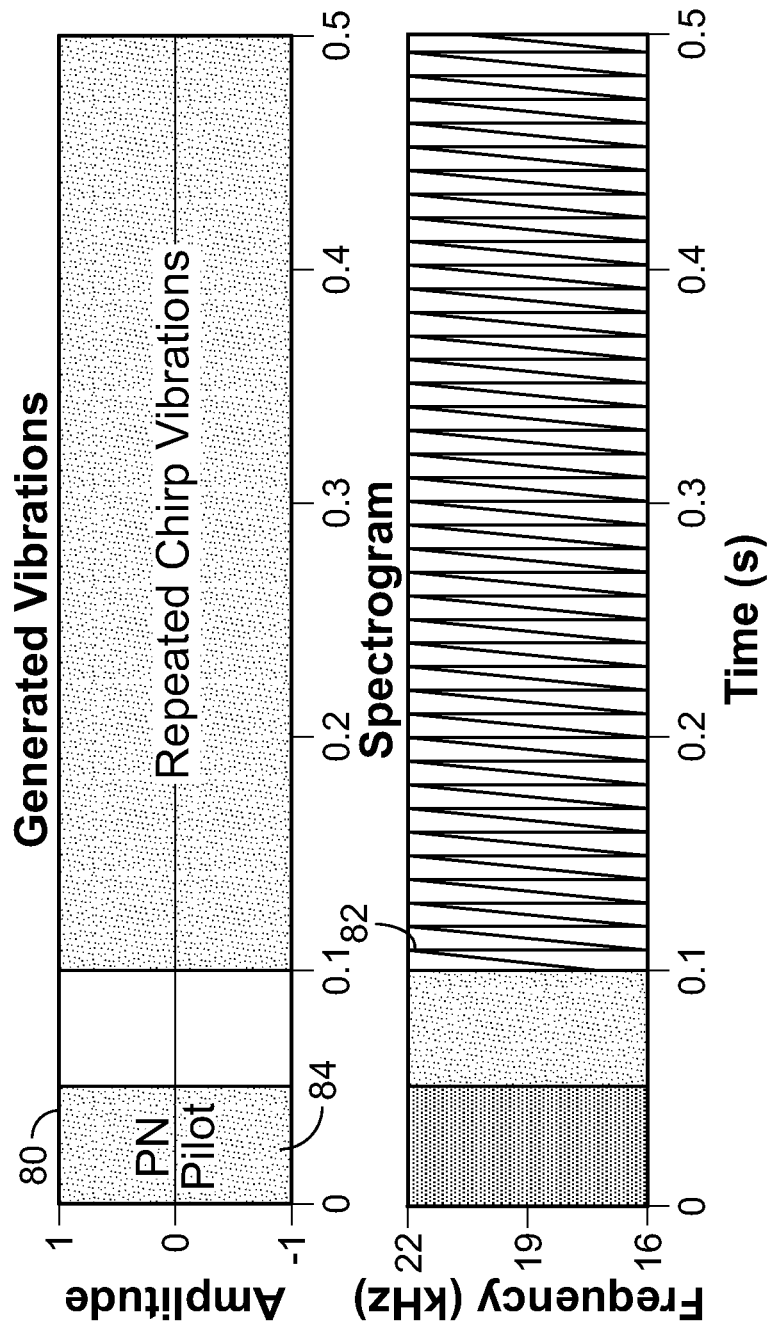
FIG. 6 illustrates an example of a generated vibration signal and its corresponding spectrogram.

FIG. 6 illustrates an example of a generated vibration signal 80 and its corresponding spectrogram 82. In particular, there is a short pseudo noise (PN) 84 sequence preamble played before the repeated chirp vibrations, which is used for the signal synchronization. After transmitting PN pilot, with a 50 ms pause, the vibration motor repeatedly transmits the chirp vibration signal to keep its continuous sensing capability while performing authentication. The length of each chirp vibration signal is set to T=10 ms, which provides high time resolution to enable continuously finger-input sensing.

Figure 7:
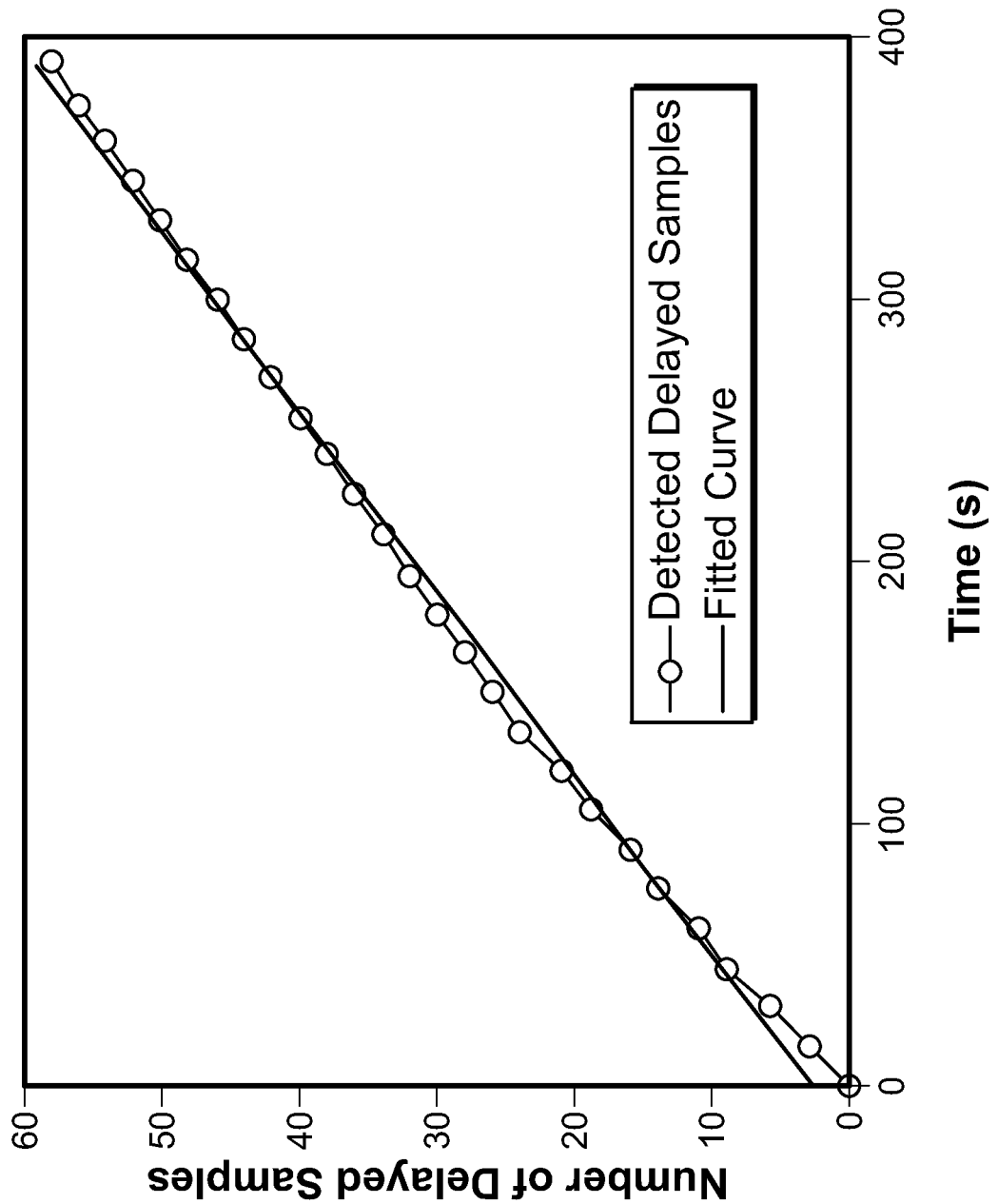
FIG. 7 is a graph illustrating clock drift effect mitigation.

Data calibration of steps 44 and 46 will now be explained in greater detail. With regard to vibration signal synchronization, the timing of the system's vibration motor and receiver needs to be synchronized, so that it can guarantee that each sliding window being used to extract vibration features contains the same parts of the chirp vibration signals without time delay. This allows the signals to be used for further comparison of their extracted features and capture the difference in each window when the finger touches different positions on the surface. In order to avoid the uncertainty, the system can add a pseudo-noise (PN) sequence preamble (i.e., 2400 samples), which has autocorrelation properties, at the beginning of the generated chirp vibration signals as illustrated in FIG. 6. A different number of samples in the preamble can be used in the present disclosure. The system can then synchronize the received vibrations using cross-correlation between the PN sequence of the received vibration signal and the known generated PN sequence. With regard to clock drift mitigation, when the vibration receiver senses the vibration, the analog voltage signals created by the sensor can be converted into the digitized signals via an Analog-to-Digital Converter (ADC). The ADC can be configured at a wide range of rates, and can be set to sample the analog signals at a fixed frequency driven by different application requirements. For instance, a few options (e.g., 32 kHz, 44.1 kHz and 48 kHz) can be set in most smartphones' audio ADCs in terms of the required audio recording quality. However, the sampling rate may be not a fixed value over time due to imperfect clock, and there exists a small gap between the real sampling rate and the configured sampling rate. To eliminate the effect caused by the clock drift, the system can determine the sampling rate offset during a short calibration phase at the beginning. During the calibration, the vibration motor periodically sends a short vibration chirp with a fixed time interval (e.g., 2s). The time intervals between these chirps can be a fixed value as well if there is no clock drift. As can be seen in FIG. 7, the system can use cross-correlation to measure the sample delays of the received vibration chirps over time. The number of the delayed samples increases linearly over time, indicating that the real sampling rate is slightly larger than the configured sampling rate but can remain a relative fixed value. The system can then use a least squares-based approach to fit a quadratic curve to the measured delayed samples, and obtain the slop k to shift the starting point $S\_p$ of each received vibration chirp to $S\_p=S\_p-\lfloor kt \rfloor$, where t is the time interval between the current vibration chirp and the first received vibration chirp.

Figure 8:
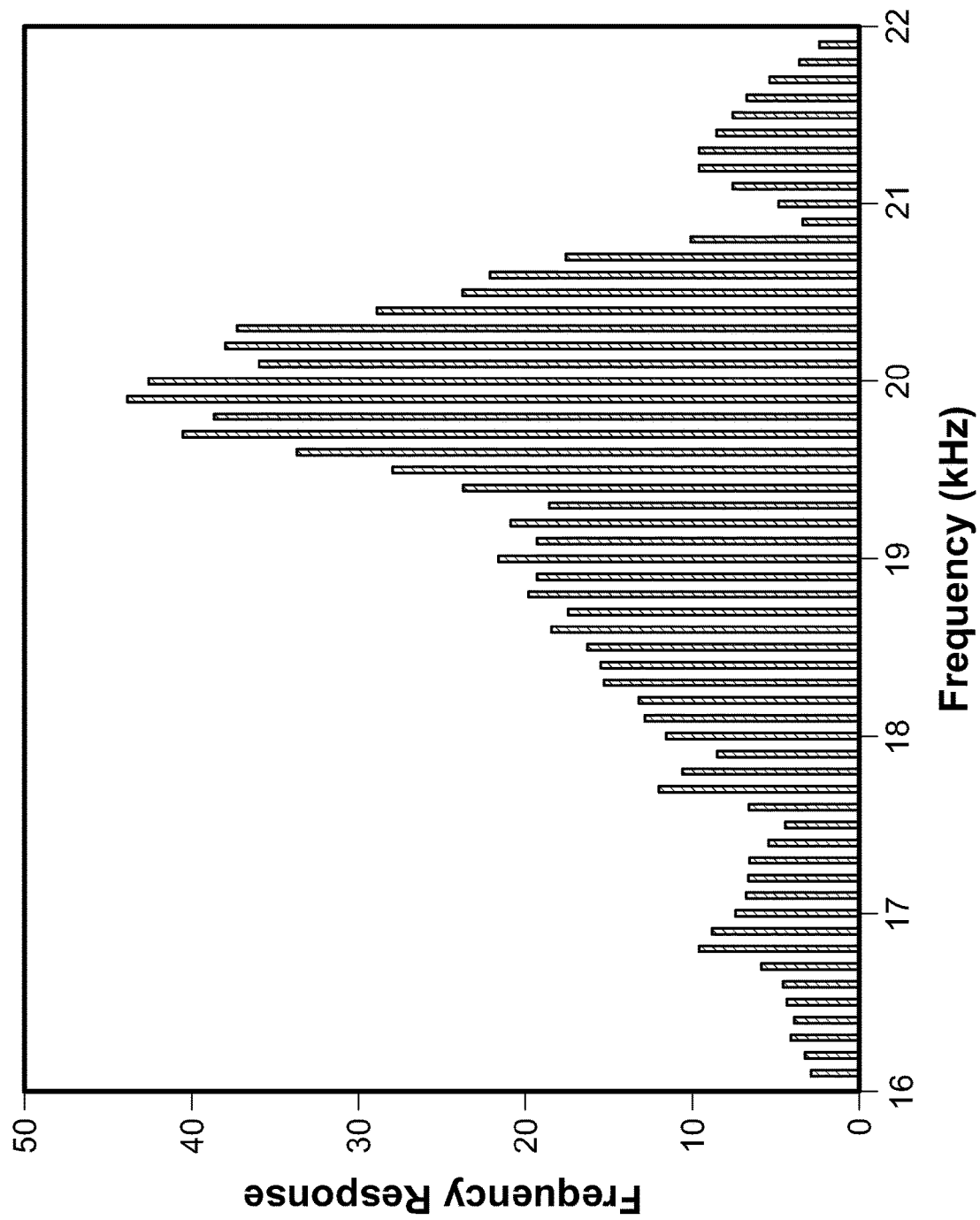
FIG. 8 is a graph of an example of a Fast Fourier Transform (FFT) of a time series of received vibration signals.

The spectral point-based feature extraction process in step 48 of FIG. 5 will now be explained in greater detail. In order to extract unique vibration features from the received vibrations to discriminate the finger touches on different surface locations and distinguish different users touching a same surface location, the system can analyze the received vibration signals in the frequency domain using, for example, a 200 ms sliding window. Other sized windows can be used. FIG. 8 is a graph of an example of a Fast Fourier Transform (FFT) of a time series of the received vibration signals, ranging from 16 kHz to 22 kHz, in a sliding window. Retransmitted chirp vibration signal has fundamental frequencies that are all multiples of the frequency 1/T Hz, where T is the time duration of each chirp vibration signal (e.g., T=0.01 s in the present systems and methods). The amplitudes of some designated frequency components in the signals (i.e., peak values in FIG. 8), called spectral points, are most sensitive to the minute changes caused by finger touching or swiping. These spectral points are more sensitive to the finger touches and could be utilized to differentiate different surface locations finger presses or finger moving along. For example, the vibration signals can be collected when a user's finger presses at four different locations of a solid surface (i.e., wooden table) equipped with the vibration motor and receiver. Any type of material for a solid surface can be used in the present system, including, but not limited to, any rigid materials (e.g., wood, metals, plastics, etc.) There can be obvious distinguishable patterns of the frequency amplitude at these 60 spectral points (i.e., (22000−16000)/100=60) between different locations, which are shown in FIG. 8. Furthermore, the spectral points in the frequency domain may not be exactly spaced at 100 Hz due to imperfect sampling module. The system can thus employ a threshold-based strategy (i.e., minimum distance between two neighboring peaks and minimum height of each detected peak) to find peaks of the frequency response to extract each spectral point feature.

The Mel-frequency cepstral coefficient (MFCC) process in step 50 of FIG. 5 will now be explained in greater detail. This process can be used to represent the short-term power spectrum of acoustic or vibration signals and can represent the dynamic features of the signals with both linear and nonlinear properties. While the MFCCs are able to distinguish people's sound differences in speech and voice recognition, they can also characterize the vibration signals transmitted via the medium of a solid surface on which the user's finger touches, because the user's behavioral and physiological characteristics (e.g. touch area and pressure) and the touching position can cause different changes to the vibration propagation. Accordingly, the system can extract the MFCC-based features to characterize the different vibration signatures when the user touches or writes at different positions on the surface. In particular, the system can calculate the MFCCs of the received vibration signals in each sliding window. The number of filter bank channels can be set to 32, and 16th order cepstral coefficients can be computed in each 20 ms Hanning window, shifting 2 ms each time. These are all example numbers and any parameters can be used in the system.

Figure 9:
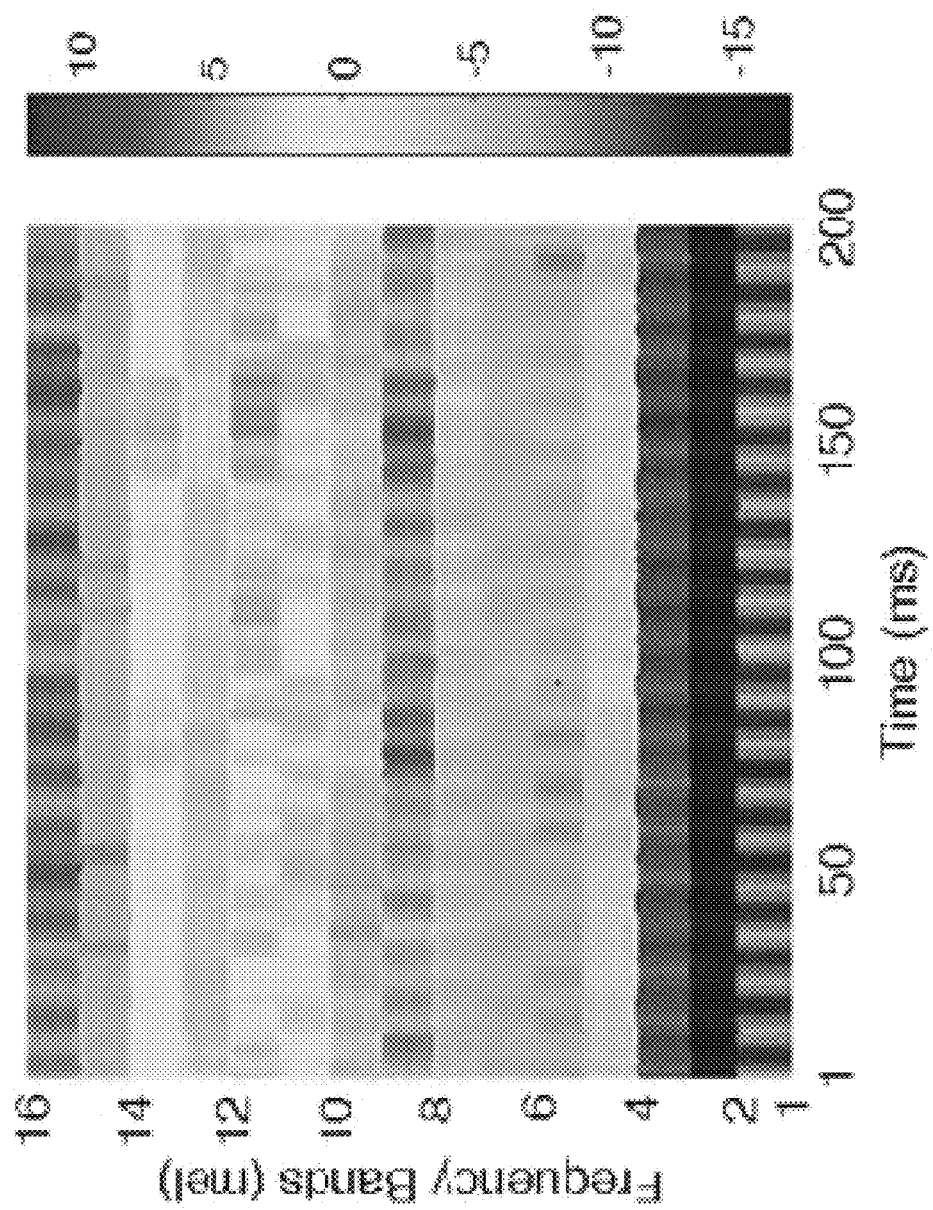
FIG. 9 illustrates a Mel-frequency cepstral coefficient extracted from received vibration signals when the user presses on a solid surface.
Figure 10:
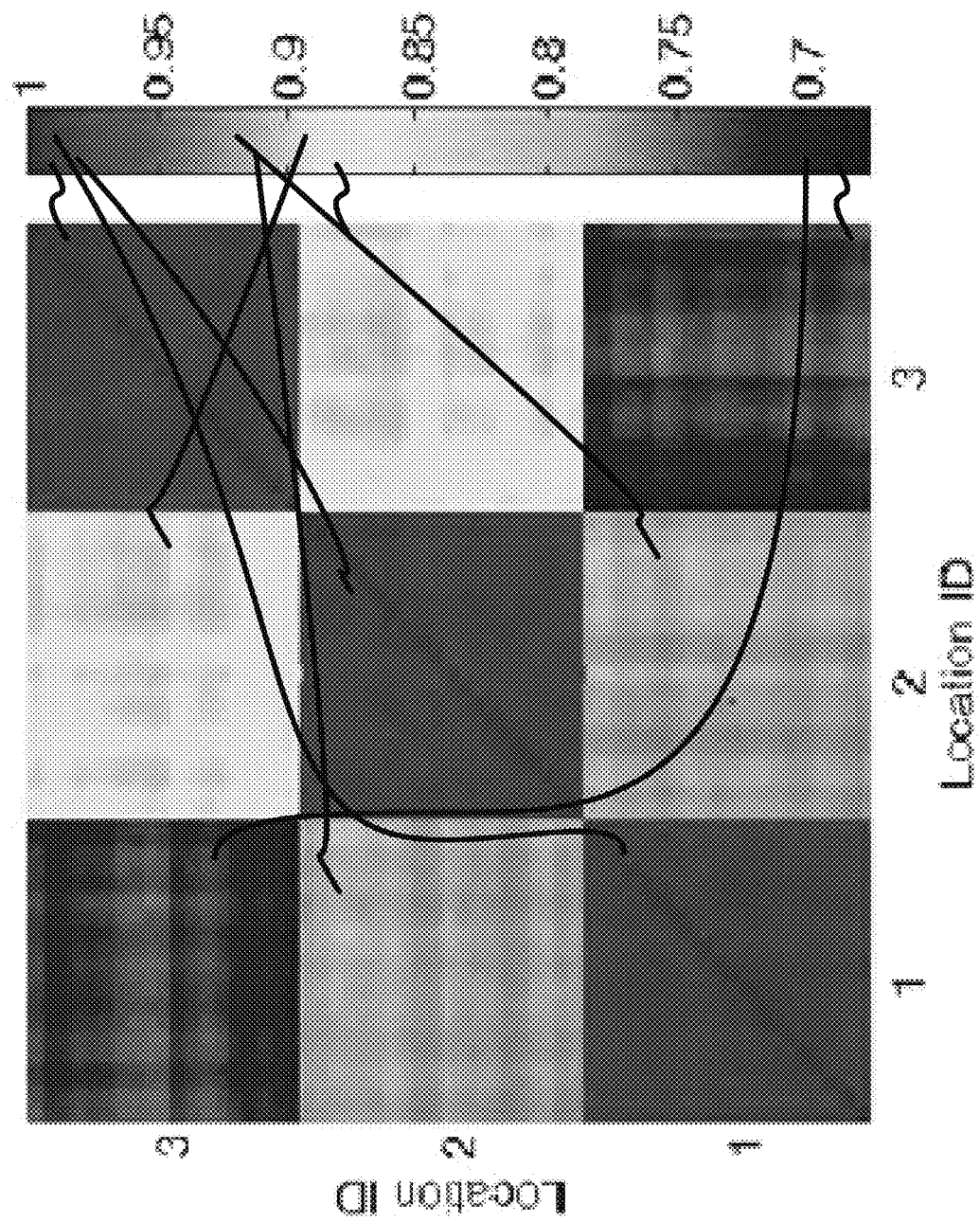
FIG. 10 shows Pearson correlation coefficient of the Mel-frequency cepstral coefficient-based features when a user's finger touches at three different locations on a surface.

FIG. 9 shows the MFCCs extracted from the received vibration signals in a 0.2 s sliding window when the user presses on a solid surface. The extracted MFCCs have a periodical pattern, which is caused by the cycle of the repeated vibration chirp signals. FIG. 10 shows Pearson correlation coefficient of the MFCC-based features when the user's finger touches at three different locations. In this experiment, twenty consecutive sliding time windows (i.e., instances) are used to extract MFCCs for each finger-touching location to compare the similarity between different finger touches. The MFCC features of the same finger-touching location present higher correlation than that of different locations, which confirms the effectiveness of utilizing the MFCC features to characterize the user's finger-touching on the surface.

Figure 11:
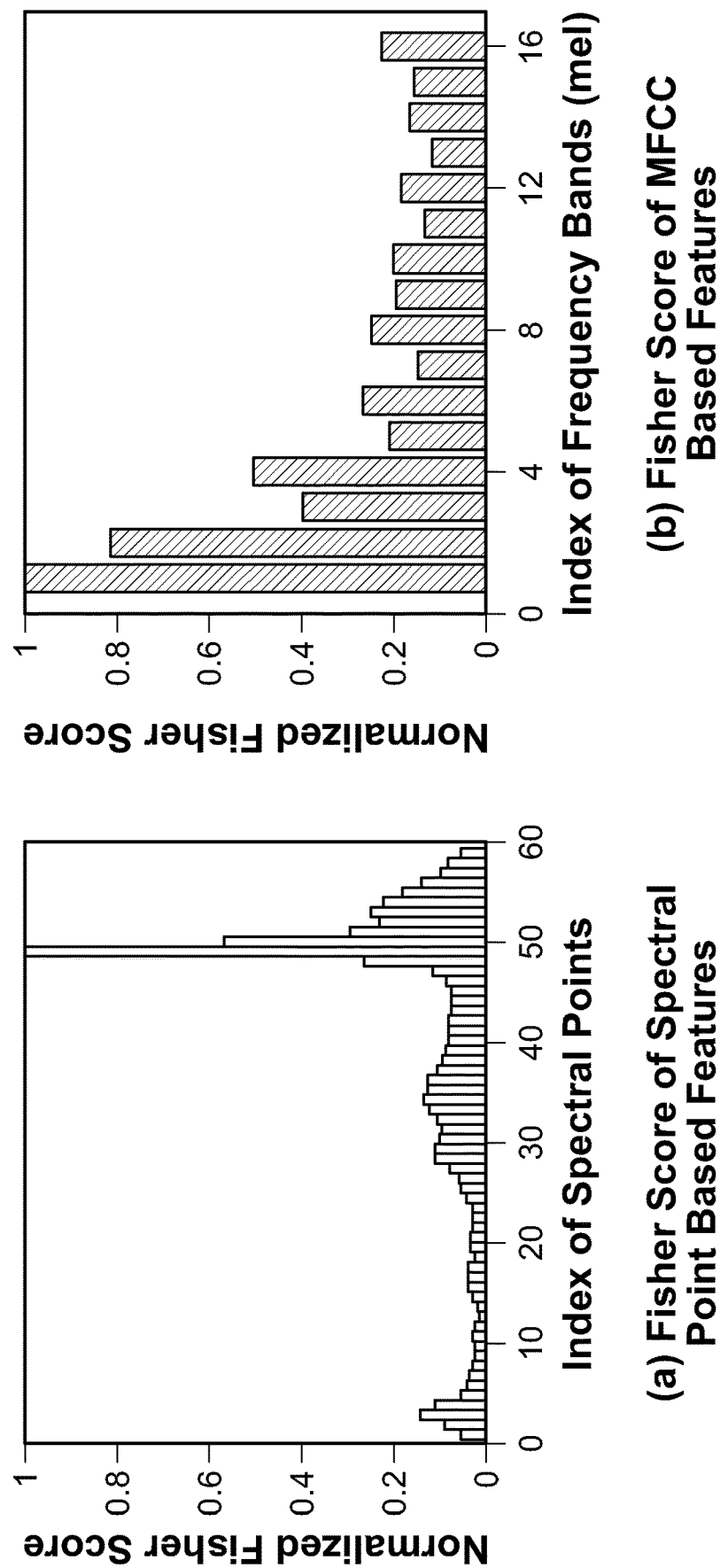
FIG. 11 includes graphs illustrating normalized Fisher scores of both spectral point-based and MFCC-based features used to perform user authentication.

Feature selection based on a Fisher score in step 52 of FIG. 5 will now be explained in greater detail. Not all extracted features including both spectral points and MFCC are unique enough to discriminate different touching locations and distinguish different users touching the same location. The discrimination power is dependent on the extracted features at specific frequencies or Mel-frequency bands. Accordingly, Fisher scores can be used to find a subset of features which are more distinct between classes (i.e., touching locations per user) and consistent within a class. The fisher score of the r-th feature candidate is defined as follows:

$$F_r = \frac{\sum_{i=1}^{c} n_i(\mu_i - \mu)^2}{\sum_{i=1}^{c} n_i \delta_i^2},$$

where $n_i$ is the number of instances in class i. And $\mu_i$ and $\delta_i^2$ denote the mean and variance of class i, i=1, . . . , c, corresponding to the r-th feature candidate. $\mu$ denotes the mean of r-th feature candidates in the whole data sets. To analyze the feature difference between different frequency bands, each spectral point or MFCCs at each frequency band can be considered as an individual feature candidate. FIG. 11 shows the normalized fisher scores of both the spectral point-based and MFCC-based features that are used to perform user authentication. The systems and methods of the present disclosure can empirically choose the top 30 spectral point-based features, and the top 8 MFCC-based features, which are more sensitive to the finger pressing and swiping.

The systems and methods of the present disclosure allow users to perform PIN number-based authentication by touching grid points on a solid surface or conduct lock pattern-based authentication by swiping a finger through the grid points. Depending on the type of applications, the solid surface could be a range of options including, but not limited to, an apartment door, a car door, an executive's office desk, or a smart appliance. The systems and methods of the present disclosure convert the received vibration signals to a time series of grid point indices, then filter out the incorrectly classified grid point indices and finally determines the PIN sequence/lock pattern based on the derived grid point indices.

Step 58 of FIG. 5 (which performs grid point index trace derivation) will now be explained in greater detail. The system takes the received vibration signals as input when the user enters PIN sequence/lock pattern. In particular, the system applies a sliding window to the vibration signals and derive vibration features (e.g. spectrum-based feature and MFCC-based feature) in every sliding window. The system then applies a machine learning-based grid point classifier based on the Support Vector Machine (SVM) using LIBSVM or Deep Neural Network (DNN) to estimate the finger-press positions in terms of the grid point index for each sliding window, by leveraging the user's personal grid profile. The resulting grid point index trace is actually an estimated finger-press position trace which reflects the finger position changes among the grid point indices in the entire PIN sequence/lock pattern input duration. When the system derives grid point index trace, it involves user's behavior and physical characteristics. It is highly difficult for an unauthorized user to obtain correct grid point index at this step because the system needs to compare with the authorized user's profile, which integrates both PIN/Lock pattern and the user's behavior characteristics. Based on the derived grid point index trace, the system can recognize the user's PIN sequence/lock pattern input and verify their identities.

FIG. 12 shows an example of the user's PIN sequence/lock pattern-based authentication on a solid surface (e.g. an apartment door) with a 3×3 grid. The predesigned grid is drawn in between the receiver and vibration motor as shown in diagram (a) of FIG. 12, and the distance between the grid points can be, for example, 3 cm. The user first builds a personal grid profile, which is discussed in greater detail herein. The user then presses the grid points "1267" sequentially to input a PIN sequence and swipes the finger through the grid points "1259" to input a lock pattern. The vibration features during the PIN sequence/lock pattern input are extracted in each sliding window and can be inputted to the SVM-based classifier or the DNN-based classifier. The estimated finger position trace (i.e., grid point index trace) for the PIN sequence input "1267" is shown in graph (b) of FIG. 12. When the user presses on a number with the finger staying on the virtual key, the consecutive same grid points corresponding to the key can be obtained, and when the user moves the finger in the air to the next key, the vibration signals are classified as "E" representing "Empty" based on the vibration profile collected when no finger presses the surface. graph (c) of FIG. 12 shows the estimated finger position trace of the lock pattern "1259". When the finger swipes near a virtual key, the vibration signals can be classified to the corresponding grid point index. In particular, the consecutive same grid points can be obtained for the duration beginning from the finger moving close to, pressing on, to just swiping away from the virtual key. Thus the derived grid point index trace can reflect the user's finger positions on the grid and can be utilized to further derive the user's PIN sequence/lock pattern inputs.

Step 60 of FIG. 5 (grid point index filtering) will now be explained in greater detail. The derived grid point index traces can contain incorrectly classified grid point indices, which are due to the unstable vibration features caused by the varying finger touching area and force when the finger is just detaching or pressing on the surface (e.g., the noises in graph (b) of FIG. 12), or are because the swiping finger is far from any of the predesigned profiled virtual keys (e.g., the noisy indices in graph (c) of FIG. 12). These incorrectly classified grid point indices can be excluded when deriving the passcode patterns. A grid point index filter can be used to determine the segments that have consecutive same grid point indices. Intuitively, these segments are corresponding to the time periods when the user's finger is pressing on or swiping near a grid point, which means they are more reliable results for identifying the PIN sequence/lock pattern. The grid point index filter can include three steps: 1) calculating the difference between every two consecutive grid point indices in the trace and the firm presses will generate consecutive "0" for the differential grid point index; 2) searching for the starting and ending points of the consecutive differential grid point indices (i.e., Os) to extract finger-press segment, indicating the finger positions of the firm finger presses right on or near virtual keys; 3) removing the grid point indices from the trace that are out of the finger-press segments. The red dots in graphs (b) and (c) of FIG. 12 are filtered grid point indices for the PIN sequence and lock pattern derivation, respectively.

Steps 62 and 64 of FIG. 5 for pin sequence derivation and lock pattern derivation will now be explained in greater detail. The system can confirm each finger-press segment based on their time length and remove the incorrect finger location estimations to derive the PIN sequence/lock pattern. The system can take into account the fact that when users enter their PIN sequences, the finger press for each PIN number lasts for a certain amount of time. When users draw their lock patterns, the system records the amount of time from when the user's finger swipes close to a number or location, to when the user's finger presses on the number or location, and to when the user's finger swipes away from the number or location. The grid point index segments shorter than this amount of time are likely to be incorrect finger location estimations. The system can set and/or determine the threshold of minimum finger-press duration (i.e., 300 ms) to remove the finger-press segments with shorter time duration. Other durations can be used in the systems and methods of the present disclosure. Finally, given the length of the user's PIN sequence/lock pattern, the system finds the same number of the longest finger-press segments as the valid finger-press segments and derives the PIN sequence/lock pattern by mapping the segments' grid point indices to the virtual keys.

Step 54 of FIG. 5 (grid profile construction) will now be explained in greater detail. Users can generate individually unique vibration features even by pressing at the same position of a solid surface due to the individual's different behavioral and physiological characteristics (i.e., touching area and pressure on the surface). The user's such unique vibration features can provide another level of security to user authentication in addition to the secrecy of passcodes. The PIN/lock-pattern-based authentication requires constructing the user's profile corresponding to every grid point, which enables successful identification of the input virtual keys during authentication. Specifically, the system records a short time period (e.g., 1 to 5 seconds per grid point) of received vibration signals when the user presses at each grid point. The recorded vibration signals are used to derive the vibration features in sliding windows. The feature in each sliding window is labeled with corresponding grid point index. In addition, the system also builds a profile when no finger touches the surface and label it as "E" (i.e., "empty") to discriminate whether finger presses on the surface. FIG. 12 illustrates the security provided by the user's unique vibration features in addition to the passcodes for PIN number/lock pattern-based authentication. As can be seen, if an attacker enters the legitimate user's same PIN number "1267" on the same grid and the same surface, the system processes the attacker's vibration signals-based on the legitimate user's grid profile and the results in graph (d) of FIG. 12 show that nearly all the vibration features of the attacker are incorrectly classified and thus cannot pass the authentication, which verifies the effectiveness of the individual physical characteristics contained in the user's grid profile.

Figure 13:
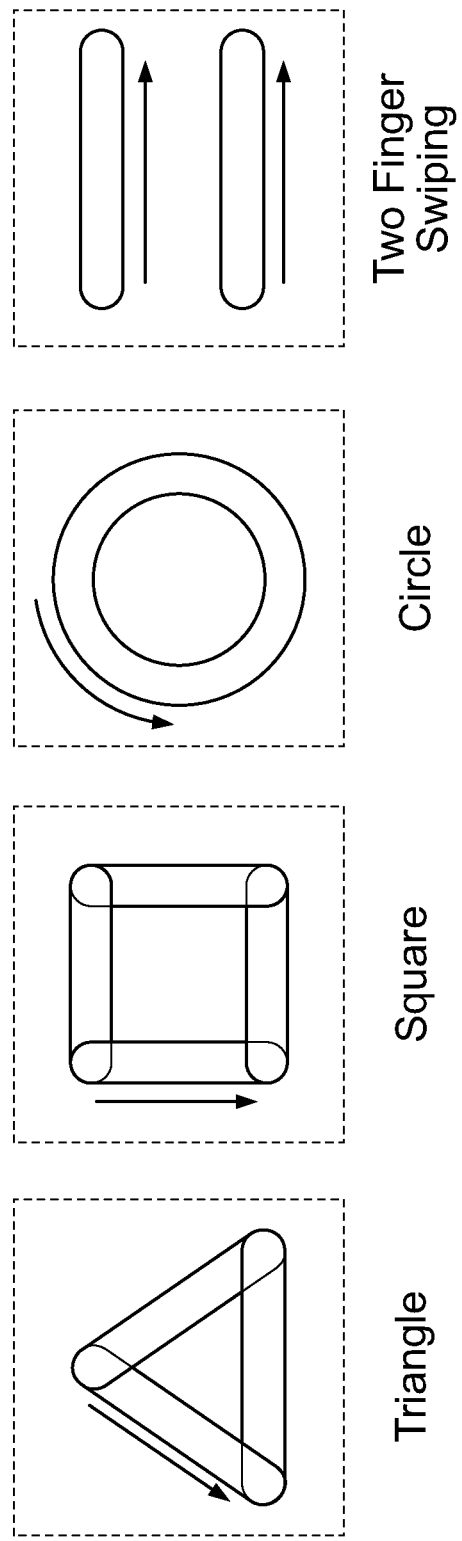
FIG. 13 illustrates example gestures that can be used in the system of the present disclosure.

FIG. 13 is a drawing which illustrates example gestures that can be used with the system of the present disclosure. Aside from PIN/lock pattern-based authentications, using gestures can provide more flexibility for authentication. In particular, the system can use, but is not limited to, four simple finger gestures as shown in FIG. 13: swiping a single finger along three patterns including a triangle, square and circle, and swiping two fingers horizontally.

Step 66 of FIG. 5 (gesture segmentation) will now be explained in greater detail. To facilitate the gesture-based authentication, the system needs to detect the occurrence of the user's gesture input from the received vibration signals and remove the vibration signals with no gestures (i.e., no touch on the surface). Specifically, the system extracts vibration features from spectral points and MFCC and then calculates vibration feature differences between the received vibration signals and those in the profile when no finger touches on the surface. The system can take into account the fact that when the user inputs a gesture, the finger swipes on the surface, causing the vibration features to differ largely from those when there is no finger touching.

Figure 14:
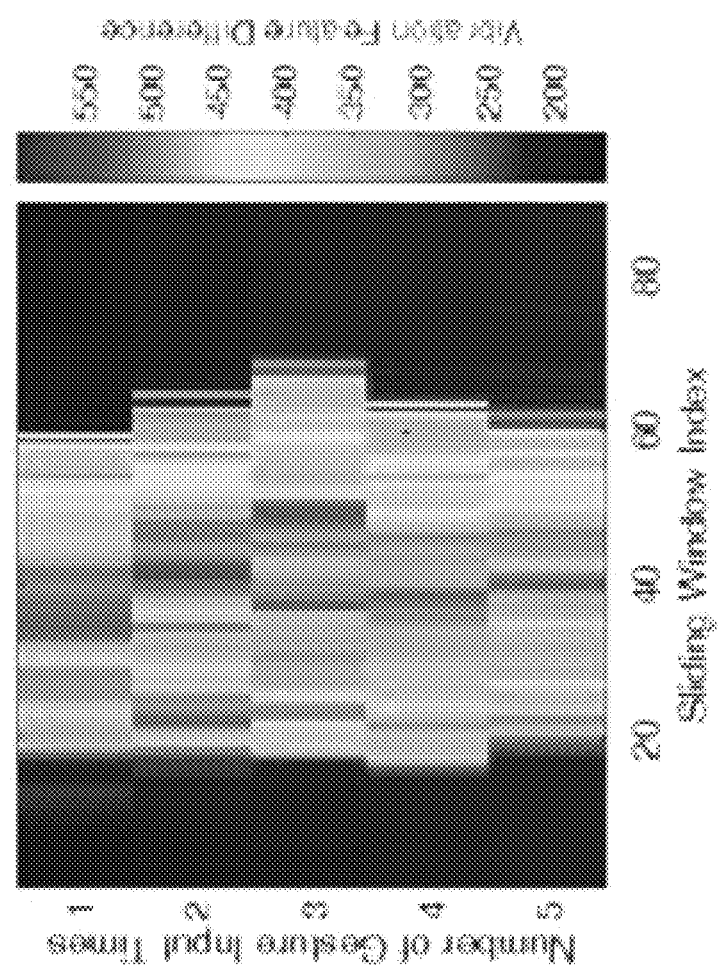
FIG. 14 shows an example of calculated vibration feature differences when a user inputs square gestures on a surface five times.

FIG. 14 shows an example of calculated vibration feature differences when the user inputs square gestures on the surface five times. For all the five gesture inputs, the vibration feature difference grows higher (e.g. over 300) when the finger swipes on the surface and falls back to lower values (e.g., around 200) when the finger releases from the surface. The system can normalize the vibration feature differences and segment each gesture via a threshold.

Steps 68, 70 and 72 of FIG. 5 will now be explained in greater detail. User authentication using simple gestures can be difficult due to lack of unique secrecy to discriminate different users. Moreover, the speed, duration, and trajectory of the same user's gestures could be different from time to time, which causes gesture inconsistency and makes the generated vibration signals present different lengths and results in varying density of locations within the swiped pattern. In addition to feature extraction containing user's unique physical traits, the system can use two techniques to complete the authentication process in high accuracy to cope with these challenges: the Dynamic Time Warping (DTW) is exploited to deal with gesture inconsistency, and the earth mover's distance (EMD) technique is employed to preserve individual diversity because the feature distribution of the same user can have a higher similarity than that from different users. Specifically, the system can derive a time series of vibration features-based on the vibration signals in segmented gestures using a sliding window. The DTW technique stretches and compresses required parts to allow a proper comparison between two data sequences. The system can compare the vibration feature traces extracted from two segmented gestures regardless of different swiping speeds. In the system, vibration features can be in a format that reports both frequency amplitude at multiple spectral points and MFCC coefficients, which was discussed in greater above. To perform multidimensional sequence alignment, the system applies Multi-Dimensional Dynamic Time Warping (MD-DTW), in which the vector norm is utilized to calculate the distance matrix according to the following formula:

$$dv_i, v'_j = \sum_{p=1}^{P}(v_i(p) - v'_j(p))^2$$

where $V = v_1, v_2, \ldots v_T$ and $V' = v'_1, v'_2, \ldots, v'_T$ are two vibration feature traces for gesture discrimination, and P is the number of dimensions of the sequence data (i.e., the number of extracted features within each window). A least cost path is found through this matrix and the MD-DTW distance is the sum of the matrix elements along the path. Besides time warped feature sequence, the histogram of the spectral point-based features preserve individual diversity and can be used to distinguish different users when even the same gesture is swiped.

Figure 15:
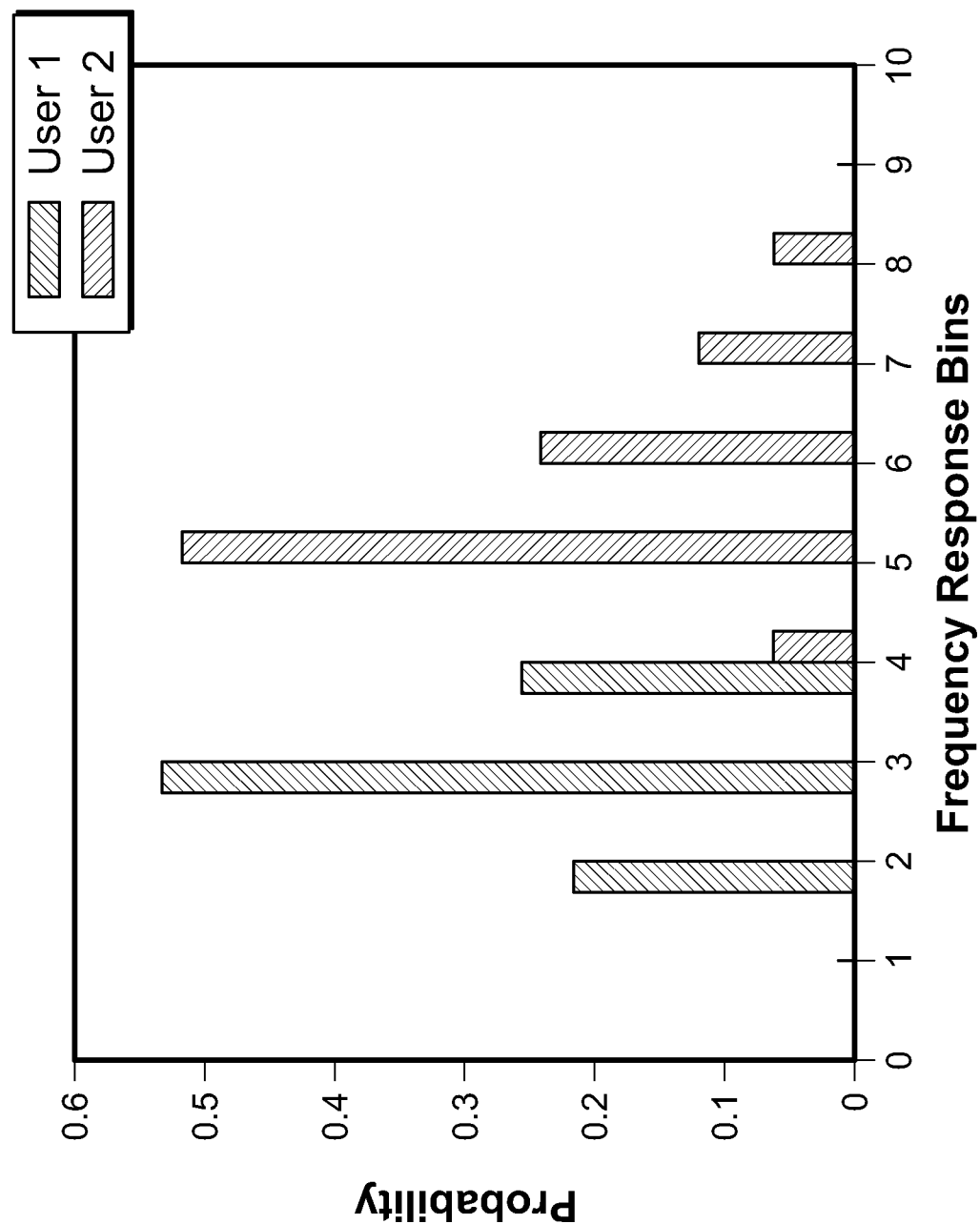
FIG. 15 is a graph illustrating feasibility study results where two users swipe their fingers followed by a circle gesture pattern performed on a desk surface.

FIG. 15 is a graph illustrating the feasibility study results where two users swipe their fingers following an exactly same circle gesture pattern on a desk surface. The histogram of frequency response (quantized to 10 bins, for example) at a specific spectral point during their swiping presents distinct distributions that can clearly distinguish these two users. The system can thus take advantage of the EMD-based distribution difference to preserve the individual diversity during gesture-based authentication. Specifically, the system can normalize the EMD distance and MD-DTW distance to be integrated for final authentication. If the integrated distance to the gesture profiles is larger than a threshold, the system can regard the swiped gesture as an unknown gesture and fail the authentication. Otherwise, the system can consider the swiped gesture from the user whose profile results in the minimum integrated MDDTW and EMD distance.

Gesture profile construction will now be explained in greater detail. Unlike grid point profile construction, the system does not need to construct profiles for each grid point for the gesture-based authentication. Instead, when constructing the gesture profile for a particular user, the system collects the vibration signals while the user swipes a finger following a predefined gesture. In particular, the system can use the sequence of the vibration features extracted from the segmented signals for building individual gesture profile. Though the profile only contains simple gestures, such profile contains the user's unique behavior and physiological characteristics and is sufficient to perform user authentication. The system can also build a profile with the vibration signals when there is no finger touching on the surface to determine the presence of finger touching or not for gesture segmentation.

Experimental and performance evaluation of an example setup of the systems and methods of the present disclosure will now be explained in greater detail. It should be noted that the testing embodiment described herein is an example only, and the parameters of the model does not limit the scope of the present disclosure.

Figure 16B:
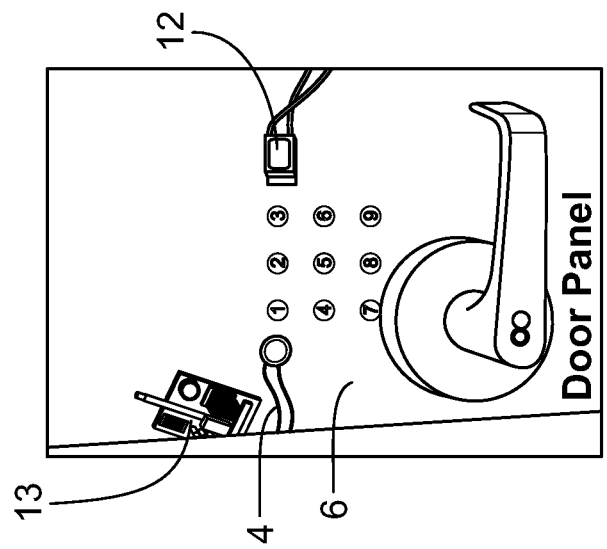
FIGS. 16A-16B are photos showing two example embodiments of a user input system.
Figure 16A:
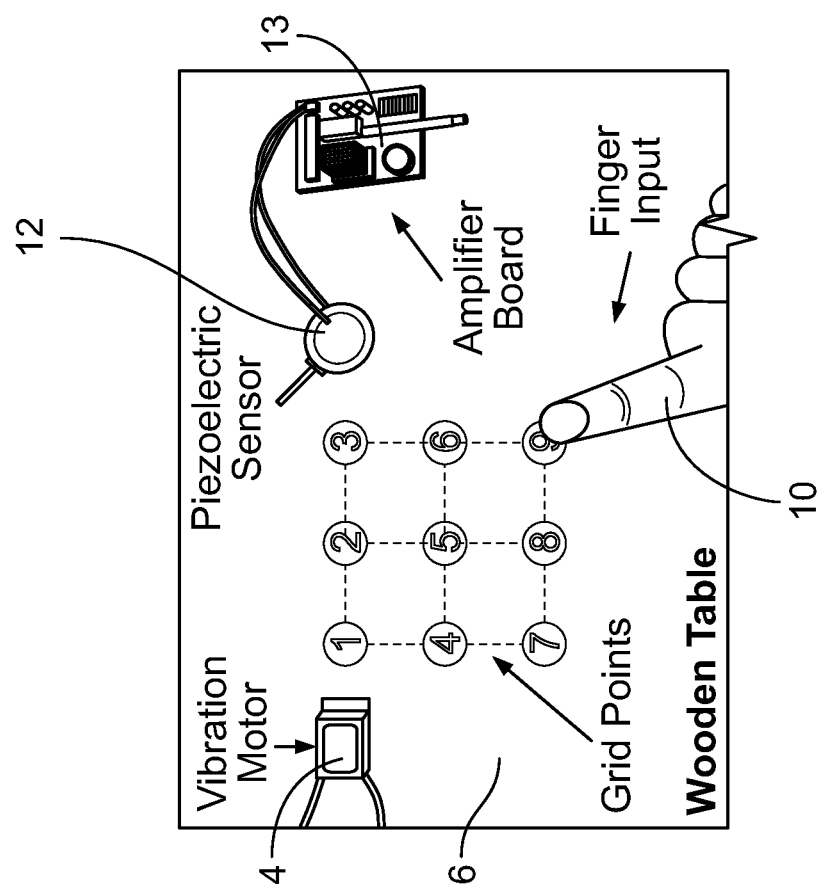

The performance of user authentication using PIN and lock patterns on a 3×3 square-shaped grid was evaluated. In practice, the grid patterns could be flexibly extended as needed. The grid is drawn on a solid surface in a typical office environment. The distance between every two adjacent grid points is 3 cm. A test was done with two different surfaces as shown in FIGS. 16A-16B: one with the testing region resided below the vibration motor and receiver on a wooden table (FIG. 16A) (e.g., the executive's desk in a company), and the other with the testing region resided in between the motor and receiver on a door panel (e.g., an apartment door) (FIG. 16B). As can be seen in FIGS. 16A and 16B, the user input system includes a vibration motor 4, a surface 6, a sensor 12, and an amplifier board 13. For the user authentication using gestures, there is no restriction of pressing/passing the grid points on the authentication surface, and instead the simplest finger gestures are used as shown in FIG. 13. The goal of the experiment is to demonstrate that even the simplest finger gestures carry the unique behavioral and physiological characteristics reflected by the physical vibrations. The gesture patterns are drawn on the table within a 6 cm×6 cm region between the vibration motor and receiver to guide user's swiping.

The vibration generator is implemented with a Linear Resonant Actuator (LRA) based motor, which has a wide frequency response. The frequency and amplitude of the generated vibration can be regulated by the frequency and peak-to-peak voltage of an input analog signal. The low-cost vibration receiver is implemented with a vibration receiver (i.e., piezoelectric sensor) and a low-power consumption amplifier, which can be easily plugged into the standard audio jack of any audio recording device (e.g., mobile phone) to sense vibration signals. The sampling rate of the vibration receiver is determined by the audio recording device, which is typically 48 kHz. The size of vibration motor and receiver is very small, which makes them easily to be attached to any solid surface. Compared to other authentication systems-based on cameras, touch screens, or biometric readers, it is a goal to explore using low-cost sensor settings (i.e., vibration motor and receiver) for the potential of wide-deployment such as in apartment buildings, hotel rooms, smart homes, office desks, etc. Besides the vibration motor and receiver, the example experiment setup needs additional supporting hardware including, but not limited to, amplifier, ADC, microcontroller and storage device to perform necessary data process, feature extraction and profile matching. With these required components, the cost of an end-to-end system could be maintained around tens of dollars (e.g., $20~$50). As a comparison, some existing authentication systems (e.g., face recognition-based and fingerprint-based) may usually cost hundreds of dollars. As noted above, the present disclosure is not limited to these specific items or this specific arrangement.

Legitimate user verification of the example test setup will now be explained in greater detail. Fifteen participants were recruited to evaluate the performance of test system under three types of authentication. The data is collected across three-month period, and 15 participants were involved across different days. Additionally, before the data collection, the users were allowed to practice multiple rounds of authentication inputs on the authenticating surface to get familiar with the system. For PIN number-based authentication, each user is asked to sequentially press the 9 grid points for 5 s to create his/her grid profiles. During verification, each user presses 10 random 4 digit PIN sequences as their passcodes. For lock pattern-based authentication, the system uses the same grid point profiles. During testing, each user swipes his/her finger through 10 lock patterns to verify the system's authentication performance. For gesture-based authentication, each user chooses one of the four gestures as shown in FIG. 13 as their preferred gestures and swipes the finger gesture 10 times. In total, 450 genuine input passcodes (i.e., PIN sequences, lock patterns and gestures) were collected for each motor/receiver placement to evaluate legitimate user access authentication. Also, attack data was collected to evaluate the system performance under attack scenarios.

An evaluation under various attack scenarios will now be discussed in greater detail. With regard to a blind attack, the attacker randomly guesses the legitimate user's PIN, lock pattern and gesture and uses his/her finger to press and swipe on the solid surface for 10 times. In total, 420 blind attack inputs were collected. For credential aware attack, the attacker gets to know the legitimate user's PIN/lock pattern/ gesture. But he has not observed how the legitimate user presses his/her PIN numbers or swipes his/her lock patterns and gestures on the authentication surface. The attacker performs the same PIN/lock pattern/gesture as the legitimate user did without knowing the legitimate user's detailed behavior. Each attacker inputs the PIN/lock pattern/gesture 10 times. In total, 420 inputs were collected. For knowledgeable observer attack, the attacker not only knows the legitimate user's PIN/lock pattern/gesture but also observes how the legitimate user inputs them on the authentication surface. Each attacker practices 5 times and then inputs the PIN/lock pattern/gesture 10 times, trying to pass the authentication. Again, 420 inputs were collected. Side-channel attack was performed by placing additional vibration receivers on the authentication surface. In particular, two receivers are employed: one is placed adjacent to the original receiver, whereas the other is placed at the other side of the surface opposite to the original receiver.

Evaluation metrics for the test system will now be explained in greater detail. The verification accuracy/attack success rate shows the percentage of correctly verified PIN numbers entered by the legitimate user or attacker respectively during the user authentication process. Specifically, it includes the complete PIN sequence verification accuracy and the PIN digit verification accuracy. The complete PIN sequence verification accuracy measures the rate of the user's input PINs being completely recognized (i.e., all numbers in the PIN sequence are correctly recognized), while the PIN digit identification accuracy shows the rate of successfully recognizing each single PIN digit. The verification accuracy/attack success rate shows the percentage of correctly verified lock patterns input by the legitimate user or attacker respectively during the user authentication phase Similarly, it includes the complete lock pattern verification accuracy and lock pattern segment verification accuracy. ROC curve is a plot of true positive rate (TPR) over false positive rate (FPR). The TPR denotes the rate of the legitimate users passing the authentication while FPR denotes the rate of the attackers successfully passing the system. Through varying the feature distance threshold in gesture-based authentication, the test results can achieve varied TPR and FPR and obtain ROC curves to evaluate the system performance.

Figure 17A:
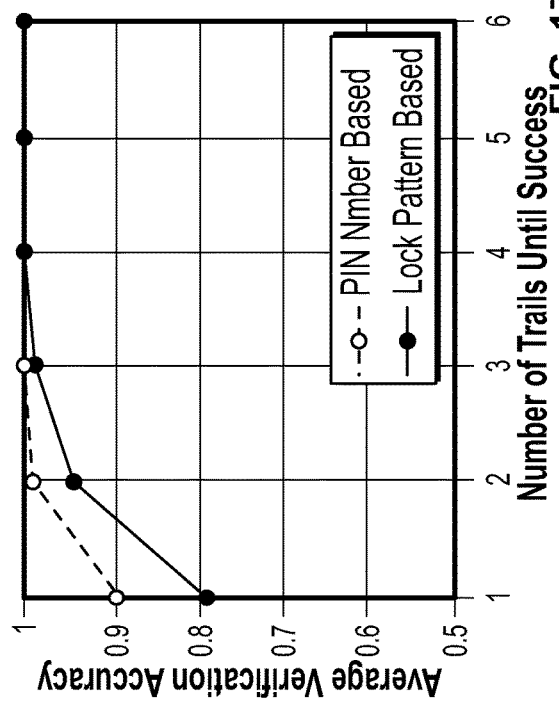
FIGS. 17A-17C are graphs illustrating performance results of a test of an example system for verifying legitimate users when the testing region is below a vibration motor and receiver.

FIG. 17A shows the identification accuracy of each PIN digit and the complete PIN sequence of 15 legitimate users. PIN number-based authentication can achieve a high verification accuracy. Specifically, the users can obtain over 95% verification accuracy of recognizing each PIN digit and the mean verification accuracy of the complete PIN sequence reaches 90%. Moreover, the verification accuracy of each PIN digit is higher than that of PIN sequence, since the complete PIN verification accuracy result requires that all the PIN numbers in the PIN sequence are correctly identified. The results demonstrate the system is effective in verifying all the legitimate users.

Figure 17B:
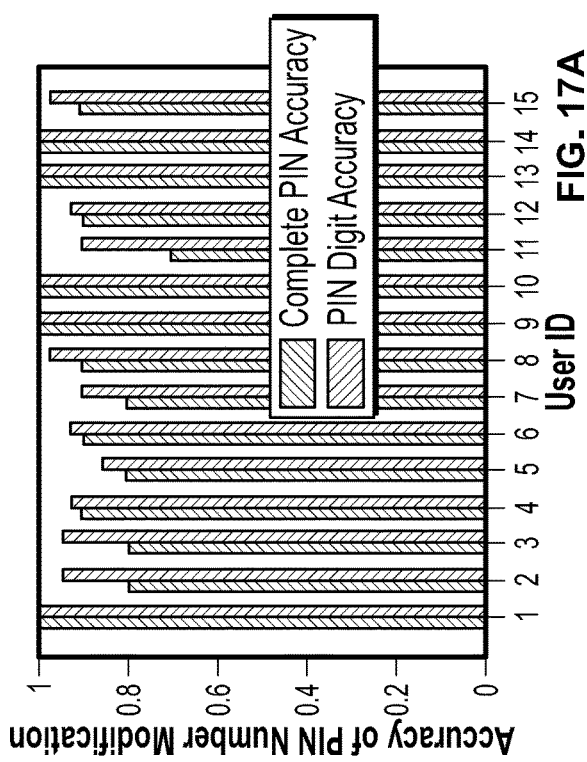

FIG. 17B shows the average authentication accuracy of the lock pattern-based verification with different number of trials. Specifically, the average verification accuracy of the complete lock pattern reaches 79% and 95% with a single trial or two trials respectively, which requires all the segments of the lock pattern to be correctly identified. In addition, the accuracy of the lock pattern identification is slightly lower than that of the PIN sequence-based authentication, which indicates that swiping a finger continuously on the surface generates more errors than pressing the finger separately on each grid point. The above verification results show that the system can achieve a good performance to authenticate users by lock patterns.

Figure 17C:
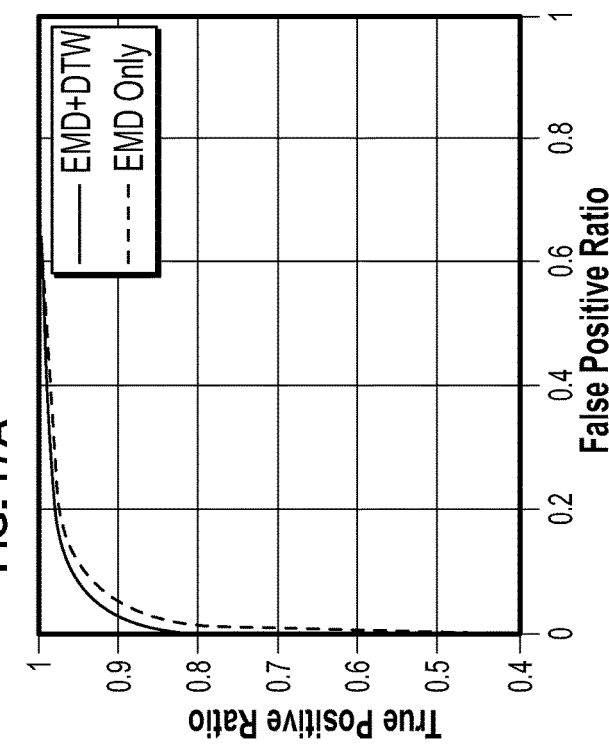

FIG. 17C illustrates the effectiveness of legitimate user verification in gesture-based authentication with ROC curves. 15 legitimate users perform their preferred simple gestures (i.e., one of our four predefined gestures as shown in FIG. 13) ten times. With only one training instance (i.e., one time swiping) for each user, it is observed that given a requirement of a 90% true positive rate, the system can achieve as low as a 5% false positive rate on average, which indicates only around 5% of gesture trials have gained unauthorized access. Moreover, using both DTW and EMD techniques can provide slightly better performance than that of only using EMD technique, since it considers the similarity in both time warped feature sequences and the features' distributions. The obtained high verification accuracy and the low-training efforts demonstrate that the system is capable to distinguish different users even though they perform the same simple gesture due to their distinct behavioral biometrics (i.e., finger tip size and structures).

FIG. 17B shows the average verification rate under different number of trials. The system can achieve over 99% verification rate with both of the PIN number and lock pattern inputs when users enter three trials. For the first-time user input, the system can achieve around 89% and 79% accuracies when users enter their PIN numbers or lock patterns, respectively. Additionally, the system can integrate with any fallback strategy to let the legitimate user bypass the system, e.g., the legitimate user can always use a physical key to enter his vehicle/apartment.

Under blind attacks, both PIN number and lock pattern-based authentications can achieve close to zero attack success rate. The results are intuitive because the attackers' random PIN guesses or lock pattern guesses are nearly impossible to pass the legitimate user's system within limited trials Similarly, for gesture-based authentication, the TPR in the obtained ROC curve is close to 100% when the FPR is close to 0%, which shows that the attackers' random gestures cannot successfully access the system.

Under credential-aware attacks, the system also achieves high accuracy (i.e., close to 0% attack success rate) for all three types of authentications. Since the attackers do not possess the knowledge of the system setting details (e.g., grid size, gesture region and the authentication surface), the attackers' finger-inputs are hard to generate the similar impacts on the vibration propagation as the legitimate users do. Knowledgeable observer attack is the most extreme attack, where the attacker is capable of knowing the user's credentials and observing the legitimate user's finger inputs. Additionally, the attacker has the knowledge of the system setting details and can perform the finger inputs on the same authentication surface. This attack will be explained in greater detail below.

Figure 18A:
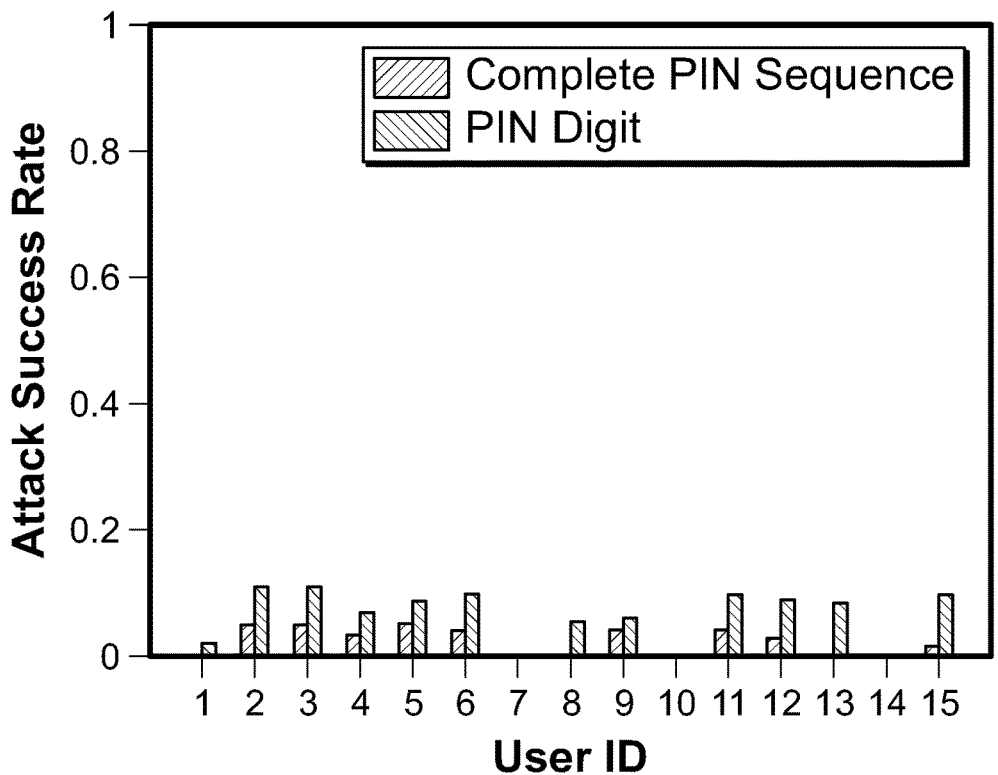
FIGS. 18A-18C are graphs illustrating performance results of user authentication under knowledgeable observer attacks when the testing region is below a vibration motor and receiver.

FIG. 18A shows the performance of the system in PIN number-based authentication under knowledgeable observer attack, where 1 of 15 users alternatively behaves as victim and other 14 users play as attackers. The system is very effective in defending against attackers even though they have the knowledge of the legitimate user's PIN and use the same system setting (e.g., grid size and authentication surface). In particular, the attackers can only break an average of around 7% single PIN digits. Furthermore, even if the attackers can successfully verify several PIN digits, it is even harder for them to break the complete PIN sequences of the legitimate user. In particular, the attackers can only achieve an average of 2% attack success rate in verifying complete PIN sequences.

Figure 18B:
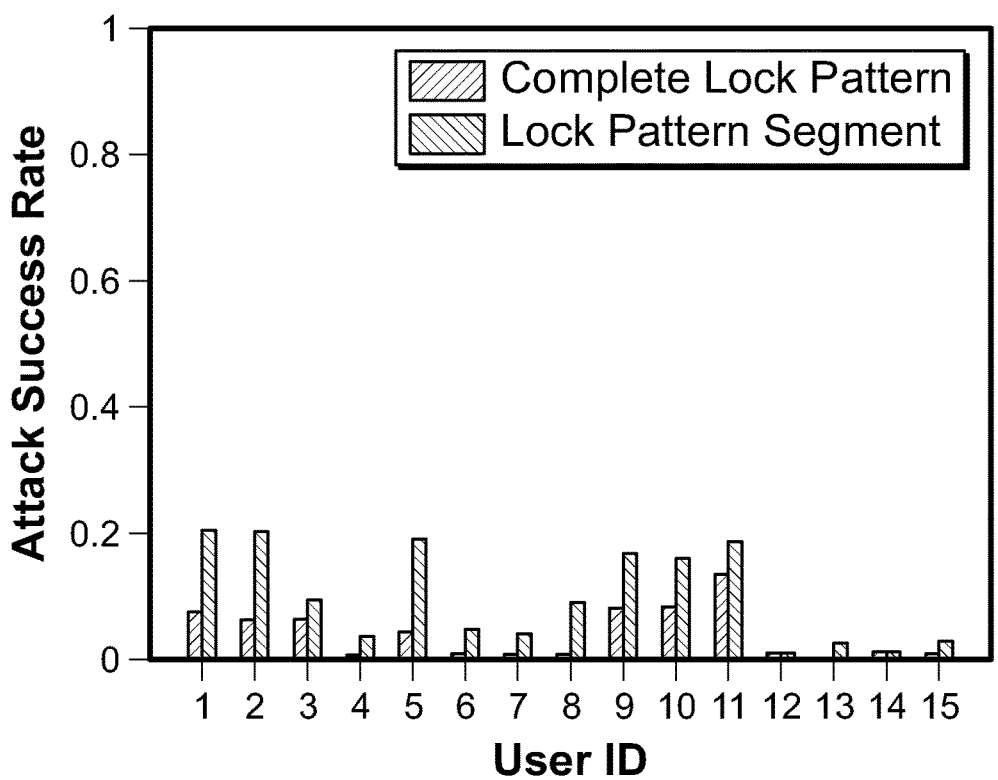

Similarly, the 15 users acted as one victim and fourteen attackers, who swipe 10 lock patterns after practice-based on the knowledgeable observation. FIG. 18B depicts the attack success rate of lock-pattern-based authentication on each legitimate user under the knowledgeable observer attack. The results show that the attackers are hard to pass the system even though they imitate the legitimate user's behavior to swipe the same lock patterns on the same grid of the same authentication surface after practice. Specifically, for the user 4, 6-8 and 12-15, all the fourteen attackers can hardly pass the legitimate user's complete lock patterns in 10 trials though they can successfully swipe around 5% accurate segments of the lock patterns. The average attack success rates of the lock pattern segment and the complete lock pattern are around 5% and 11% respectively. Moreover, the performance of the lock pattern-based authentication under knowledgeable observer attack is comparably good to that of the PIN number-based authentication.

Figure 18C:
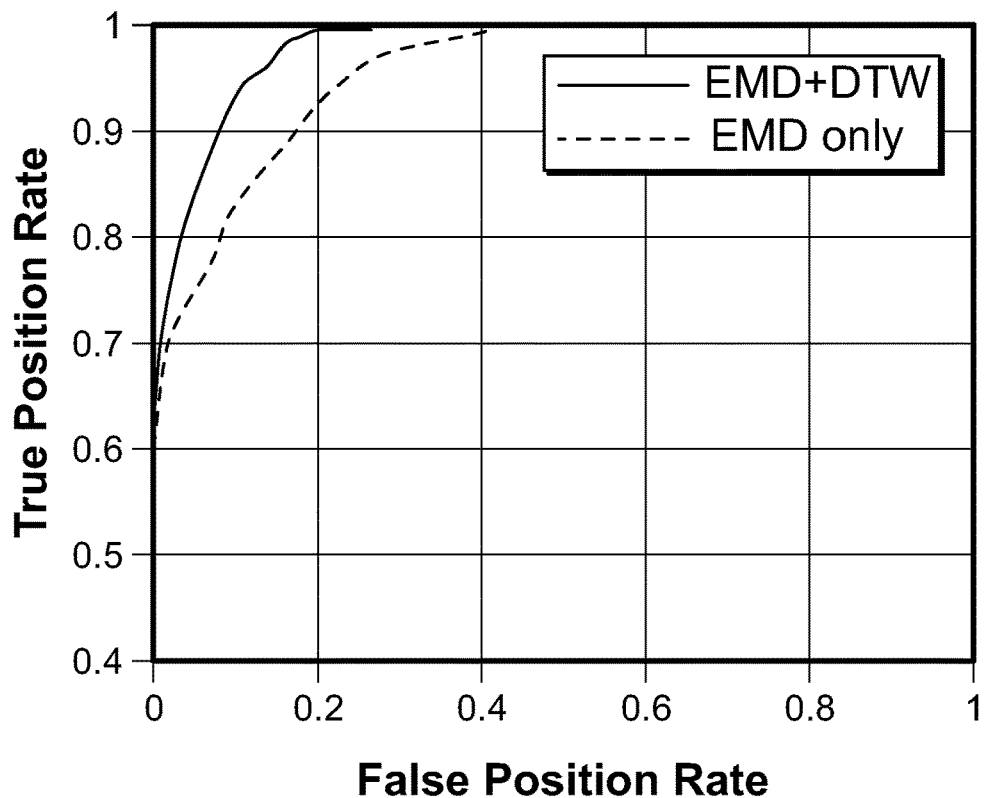

The performance of the system in gesture-based authentication under knowledgeable observer attacks, where attackers try to mimic the legitimate user's swiping gestures was also evaluated. In order to test the worst case in the system, one single training data for the legitimate user was relied on. FIG. 18C shows the ROC curve, where as low as a 3% false positive on average given a requirement of a 80% true positive rate can be achieved. Even for only using EMD technique, it can still achieve as low as a 8% false positive rate on average given a requirement of a 80% true positive rate. The results indicate that, even for the most challenging knowledgeable observer attack, the system is still effective in defending against attackers and successfully authenticate legitimate users in the meanwhile.

Figure 19:
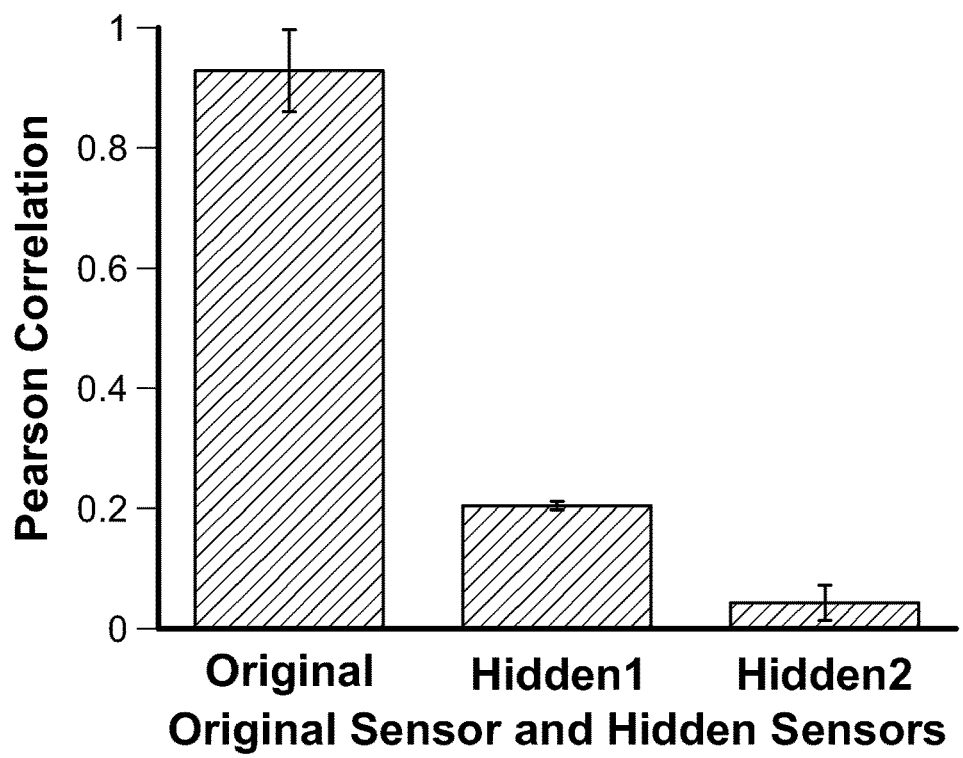
FIG. 19 is a graph showing the similarity between vibrations received by an original receiver and hidden receivers.

One may suspect that attackers can place hidden vibration receivers on the authentication surface to recover the vibration signals and obtain the unique features of the legitimate user. In reality, the hidden receiver cannot be placed at the exact same location as the system receiver. Thus, in the experiment conducted a first hidden receiver and a second hidden receiver were used. These receivers were placed at two representative locations that an adversary may choose to launch a side-channel attack. Particularly, the first hidden receiver is placed adjacent to the original receiver, whereas the second hidden receiver is placed at the other side of the authentication surface (around 3 cm thickness) opposite to the original receiver. FIG. 19 shows the mean and standard deviation of the Pearson Correlation coefficients between the signals received by the original receiver and two hidden receivers after the designed vibration chirps are generated 20 times. It is observed that the first and second hidden receivers can only achieve a very low correlation coefficient less than 0.2. This indicates that the vibration signals received by hidden receivers present very different patterns comparing to that received by the original receiver even when the hidden receivers are placed very close to the original receiver, making the attacks via a hidden vibration receiver ineffective.

Furthermore, a nearby microphone can record the acoustic sounds emitted by the vibration motor, however, the additional transmission path (i.e., air between the vibration motor and microphone) can largely change the vibration patterns, making it also difficult to recover the similar vibration signals received by the system vibration receiver. Additionally, physical vibrations can be recovered to a certain extent by using wireless signals and high-speed cameras. However, these solutions can only recover relatively low-quality audio/vibrational signals due to the limits of the hardware sensing ability in both vibration amplitude and frequency. Thus, they are mainly used for eavesdropping human speech sounds whose frequency typically falls below 1 KHz.

Figure 20:
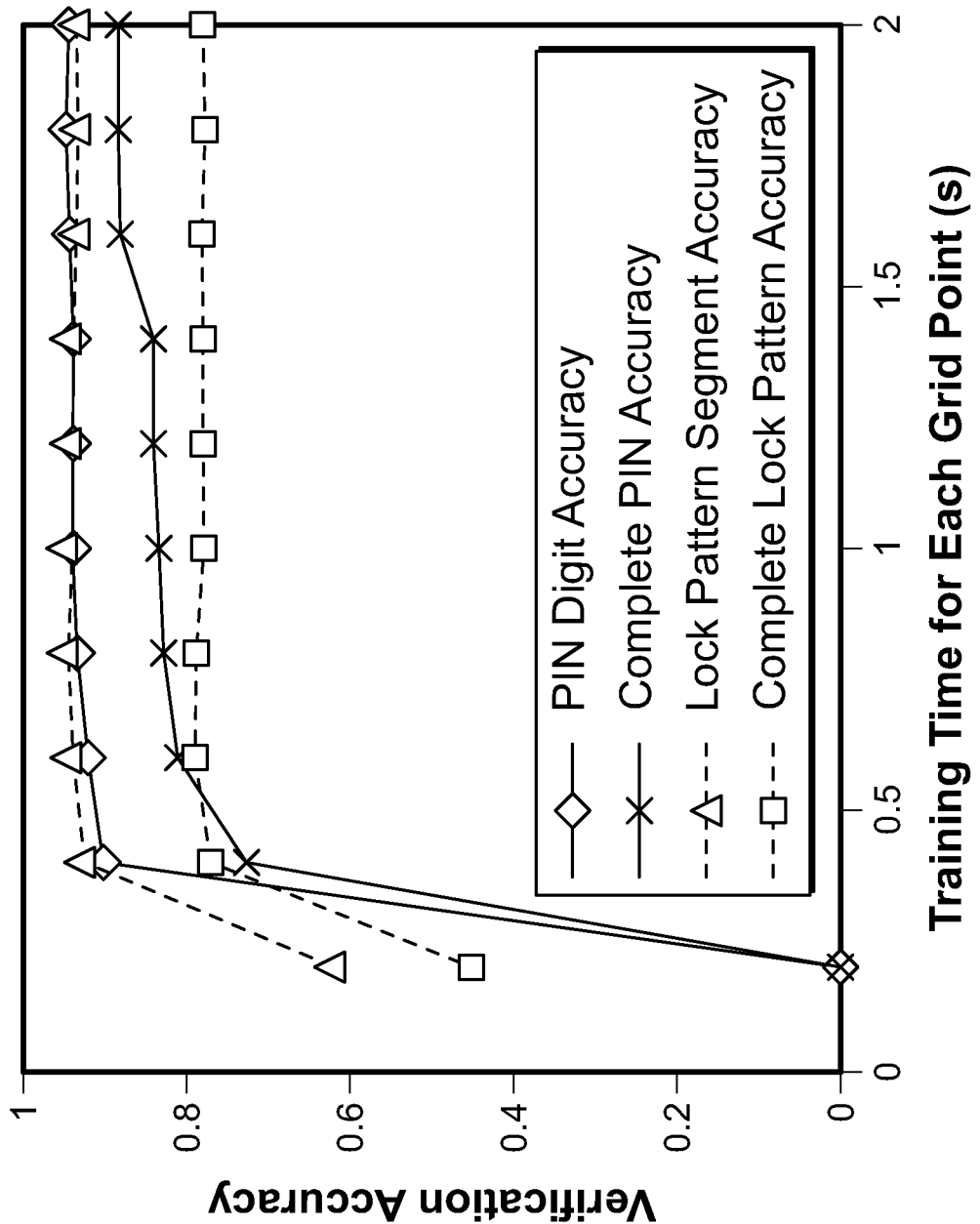
FIG. 20 is a graph showing performance of both PIN number-based and lock pattern-based authentications with different grid point training time periods.

The system can achieve around 90% accuracy in identifying each PIN digit/lock-pattern segment with the grid point training time over 0.4 seconds while the identification of complete PIN sequences or complete lock pattern achieve over 80% accuracy with the grid point training time over 0.6 seconds as shown in FIG. 20. Moreover, the PIN sequence/lock pattern-based authentication can achieve higher accuracy with longer training time and the accuracy reaches stable when the training size is over around 2 seconds.

From the results as shown in FIG. 17C and FIG. 18C, the gesture-based verification can obtain very high authentication accuracy with the training profile only containing one single gesture training instance. The results also indicate that our gesture-based authentication system could work with a very small training data size.

Figure 21:
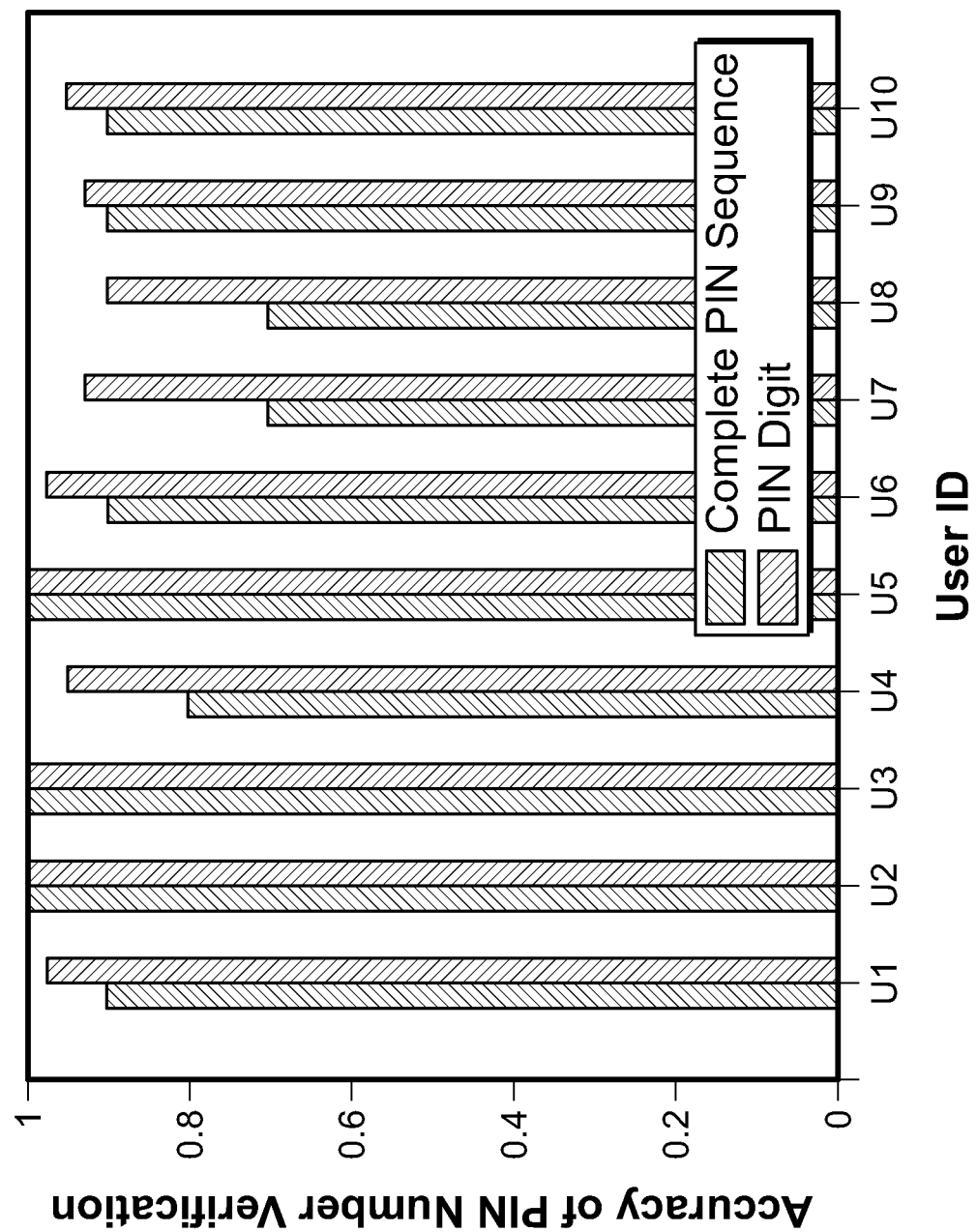
FIG. 21 is a graph showing performance of PIN number-based authentication in verifying a legitimate user when a testing region is on a door panel.

The positions of the vibration motor and the piezoelectric sensor can be changed to the center of each side and evaluate the PIN sequence verification accuracy on the grid of the door panel surface. Ten users are first asked to construct their individual grid profile and then input their PIN sequences with this new experimental setup for verification. The results in FIG. 21 show that our PIN number-based authentication can achieve comparably high verification accuracy for this setup. In particular, the accuracies of verifying the complete PIN sequence and PIN digit are 88% and 94% respectively. The similar results can also be observed for lock pattern-based and gesture-based authentication. Thus the system is robust for different vibration generator/receiver placements.

Serving as a concrete starting point of vibration-based authentication system, the system is a low-cost and easy to deploy solution that has a high potential to work at various places such as apartment buildings, hotel rooms, smart homes, etc. The system implements the idea of low-cost low-power tangible user authentication beyond touch screens to any solid surface to support smart access applications (e.g., apartment entrances, vehicle doors, or smart appliances). Utilizing low-cost physical vibration, the system performs ubiquitous user authentication via finger-input by integrating passcode, behavioral and physiological characteristics, and surface dependency together to provide enhanced security. The system is built upon a vibration-based touch-sensing technique that enables touching and writing on any solid surface through analyzing unique vibration signal features (e.g., frequency response and cepstral co-efficient) in the frequency domain. It is easy to deploy and flexibly provides users with three independent forms of secrets (including PIN number, lock pattern, and simple gesture) to gain security access by developing new techniques of virtual grid point derivation, featured-based dynamic time warping (DTW) and distribution analysis-based on earth mover's distance (EMD). The system is resilient to side-channel attacks. And it can verify legitimate user with high accuracy under minimum training efforts while successfully deny the access requests from unauthorized users with a low false positive rate.

Figure 22:
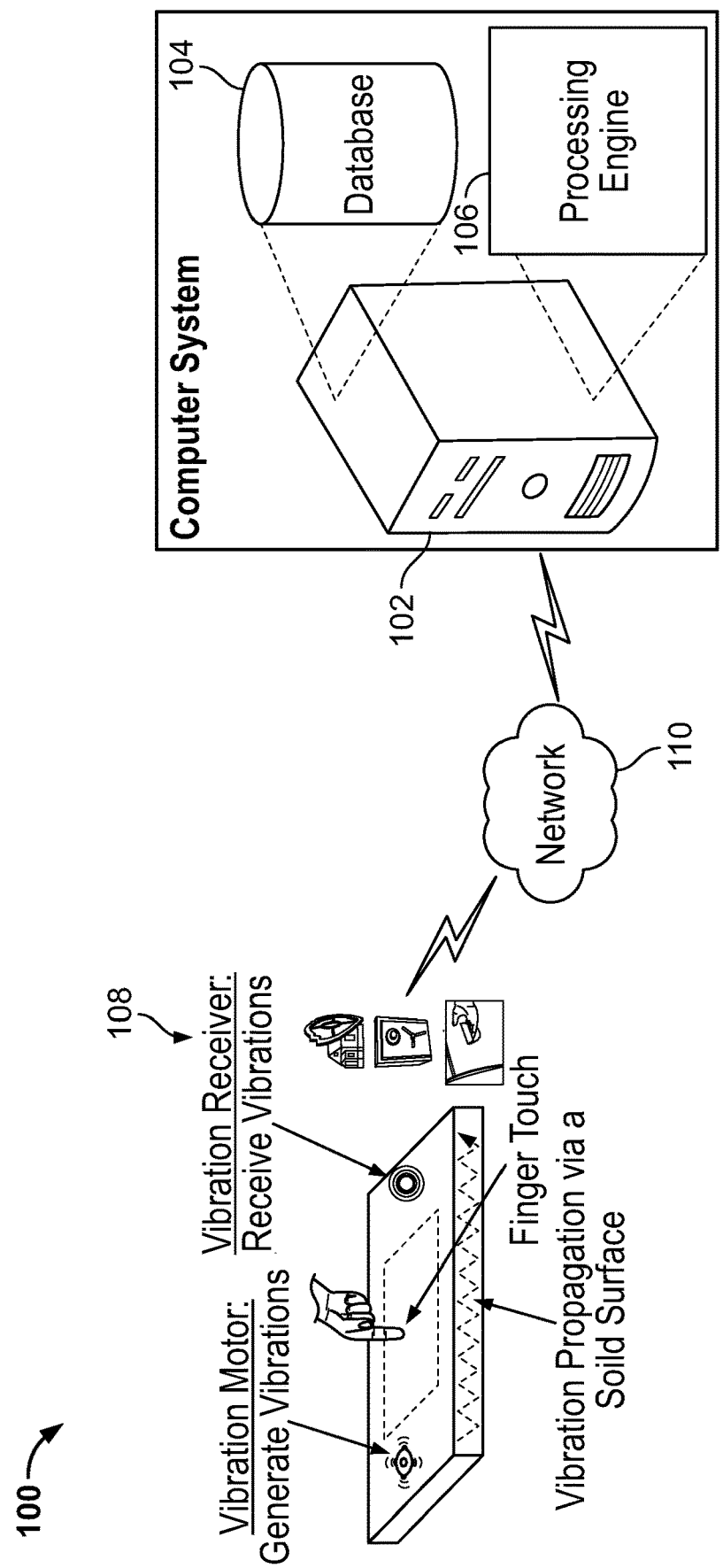
FIG. 22 is diagram illustrating hardware and software components of the system of the present disclosure.

FIG. 22 is diagram illustrating hardware and software components of the system of the present disclosure. A system 100 can include a computer system 102. The computer system can include a database 104 and a processing engine 106. The system 100 can also include a user input system 108 for receiving the vibration signals (as discussed above) and for communicating with the computer system 102 over a network 110. Alternatively, the computer system 102 can be local to the user input system 108, if desired. The computer system 108 can be computer devices in which the participants perform the tasks as described above. Network communication could be over the Internet using standard TCP/IP communications protocols (e.g., hypertext transfer protocol (HTTP), secure HTTP (HTTPS), file transfer protocol (FTP), electronic data interchange (EDI), etc.), through a private network connection (e.g., wide-area network (WAN) connection, emails, electronic data interchange (EDI) messages, extensible markup language (XML) messages, file transfer protocol (FTP) file transfers, etc.), or any other suitable wired or wireless electronic communications format. The computer system 102 could include any suitable computer server (e.g., a server with an INTEL microprocessor, multiple processors, multiple processing cores) running any suitable operating system (e.g., Windows by Microsoft, Linux, etc.). Alternatively, the computer system could include a field-programmable gate array (FPGA) that can run the mathematical models simultaneously upon receipt of the cognitive data in a closed-loop system. The systems and methods of the present disclosure could be used as a user input device for a computer, replacing a conventional keyboard or touchscreen.

Figure 23:
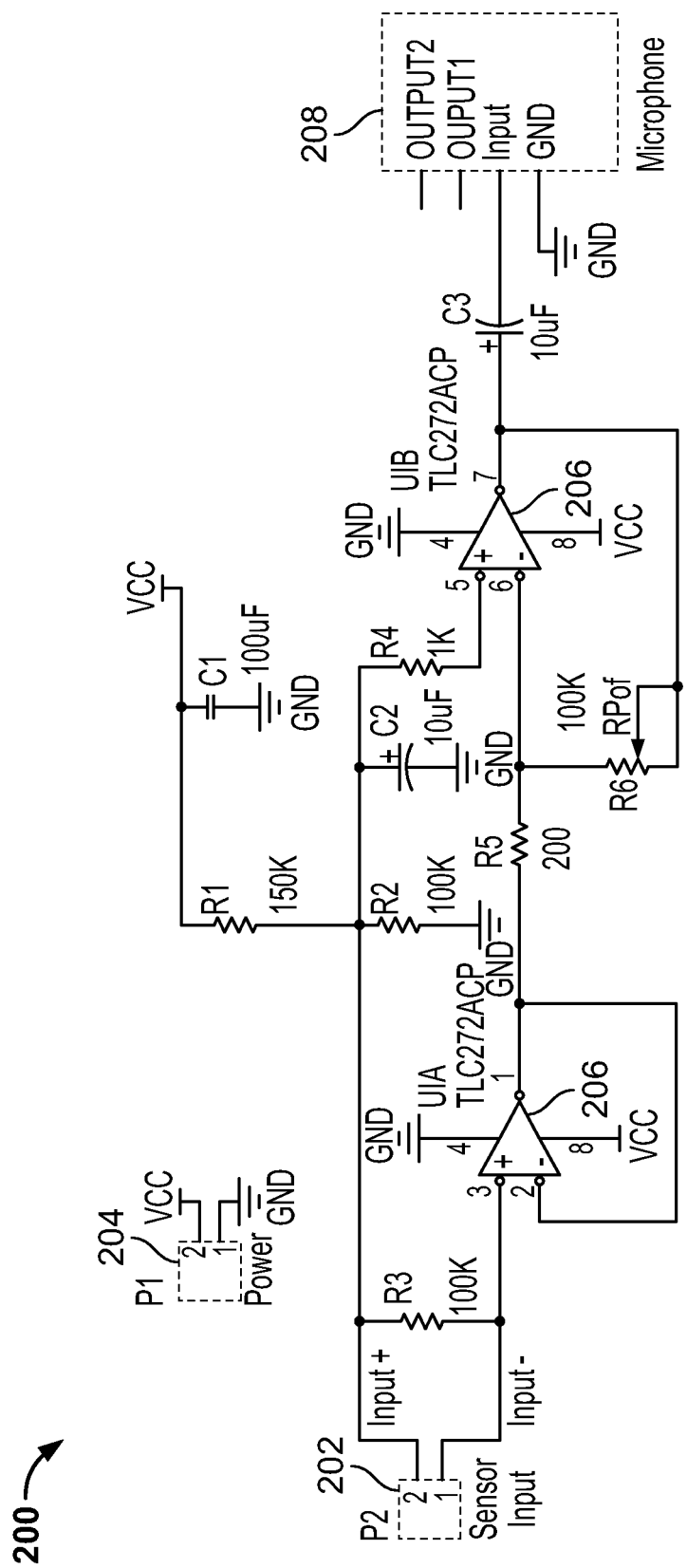
FIG. 23 is a schematic diagram illustrating electric circuit components for amplifying a signal received by a sensor of the system of the present disclosure.

FIG. 23 is a schematic diagram illustrating an electric circuit 200. The circuit 200 amplifies a signal received by a piezoelectric sensor 202. The sensor 202 receives vibration signals as discussed in connection with the embodiments above. The circuit 200 includes a power supply 204 which can be any known power source. As can be seen in the circuit 200, the various electrical components amplify the signal of the sensor 202 through the use of a plurality of op amps 206. The amplified signal is received by a microphone channel 208 which can located in a smartphone or other similar smart device or personal computer. The signal can be amplified during data collection.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A user input system comprising:
  a surface;
  an electronic device associated with the surface, the electronic device remote from and in communication with the surface;
  a vibration motor in contact with a the surface and generating vibrations in the surface, the vibrations altered by a user touching the surface to create altered vibrations;
  a sensor in contact with the surface and detecting the altered vibrations in the surface; and
  a processor in the electronic device, the processor in communication with the sensor, the processor receiving and analyzing data corresponding to the altered vibrations to determine whether a user's touch on the surface matches a stored vibration profile of the user.

2. The user input system of claim 1, wherein the processor authenticates the user based on the data corresponding to the altered vibrations.

3. The system of claim 1, wherein the processor stores the data corresponding to the altered vibrations in order to enroll the user in the system.

4. The system of claim 1, wherein the processor analyzes the vibration data using a spectral point-based feature extraction process to determine the location of the user's touch and to distinguish between the user touching the surface and a plurality of other users touching the surface.

5. The system of claim 1, wherein the processor analyzes the vibration data using a Mel-frequency cepstral coefficient-based feature extraction process to determine the location of the user's touch and to distinguish between the user touching the surface and a plurality of other users touching the surface.

6. The system of claim 1, wherein the processor analyzes the vibration data using a Fisher score to determine the location of the user's touch and to distinguish between the user touching the surface and a plurality of other users touching the surface.

7. The system of claim 1, wherein the processor determines a pin number entered by the user on the surface by assigning numbers to a plurality of locations on the surface and analyzing the vibration data to determine which of the plurality of locations the user touched.

8. The system of claim 1, wherein the processor determines a lock pattern entered by the user on the surface by assigning a plurality of locations on the surface as points on a grid and analyzing the vibration data to determine an order of the plurality of locations touched by the user.

9. The system of claim 1, wherein the processor determines a gesture entered by the user on the surface.

10. The user input system of claim 1 wherein the surface comprises one of: a window, a door, an appliance, a table and a desk.

11. The system of claim 1, wherein the processor generates a pseudo-noise sequence preamble to synchronize the vibrations generated by the vibration motor and the altered vibrations detected by the sensor.

12. The system of claim 11, wherein the processor determines a clock drift value and uses the clock drift value to synchronize the vibrations generated by the vibration motor and the altered vibrations detected by the sensor.

13. A method of determining a user input, comprising:
  generating a vibration in a surface remote from any electronic communication device;
  altering the vibration in the surface by touching the surface to create an altered vibration;
  sensing, with a sensor, vibration data, the vibration data corresponding to the altered vibration; and
  analyzing the vibration data to determine whether a user's touch on the surface matches a stored vibration profile of the user.

14. The method of claim 13, further comprising determining a user input based on a location of the user's touch on the surface.

15. The method of claim 13, further comprising authenticating the user based on the vibration data.

16. The method of claim 13, further comprising storing the vibration data in order to enroll the user in the system.

17. The method of claim 13, further comprising analyzing the vibration data using a spectral point-based feature extraction process to determine the location of the user's touch and to distinguish between the user touching the surface and a plurality of other users touching the surface.

18. The method of claim 13, further comprising analyzing the vibration data using a Mel-frequency cepstral coefficient-based feature extraction process to determine the location of the user's touch and to distinguish between the user touching the surface and a plurality of other users touching the surface.

19. The method of claim 13, further comprising analyzing the vibration data using a Fisher score to determine the location of the user's touch and to distinguish between the user touching the surface and a plurality of other users touching the surface.

20. The method of claim 13, further comprising determining a pin number entered by the user on the surface by assigning numbers to a plurality of locations on the surface and analyzing the vibration data to determine which of the plurality of locations the user touched.

21. The method of claim 13, further comprising determining a lock pattern entered by the user on the surface by assigning a plurality of locations on the surface as points on a grid and analyzing the vibration data to determine an order of the plurality of locations touched by the user.

22. The user input system of claim 13 wherein the surface comprises one of: a window, a door, an appliance, a table and a desk.

23. The method of claim 13, further comprising generating a pseudo-noise sequence preamble to synchronize the vibrations generated by the vibration motor and the altered vibrations detected by the sensor.

24. The method of claim 23, further comprising determining a clock drift value and uses the clock drift value to synchronize the vibrations generated by the vibration motor and the altered vibrations detected by the sensor.

25. The method of claim 13, further comprising determining a gesture entered by the user on the surface.

26. The method of claim 25, further comprising reconciling user inconsistency in performing the gesture using dynamic time warping.

27. The method of claim 25, further comprising reconciling user inconsistency in performing the gesture using an earth mover's distance.

28. A user input system comprising:
a vibration motor in contact with an authentication surface of a solid non-electronic surface and generating vibrations in the solid non-electronic surface, the vibrations altered by a user touching the authentication surface to create altered vibrations;
a sensor in contact with the authentication surface and detecting the altered vibrations in the solid non-electronic surface; and
a processor in an electronic device, the processor remote from the surface, the processor in communication with the sensor, the processor receiving and analyzing data corresponding to the altered vibrations to determine a location of a user's touch on the authentication surface.

29. The user input system of claim 28 wherein the solid surface comprises one of: a window, a door, an appliance, a table and a desk.

* * * * *

UNITED STATES PATENT AND TRADEMARK OFFICE
CERTIFICATE OF CORRECTION

PATENT NO. : 11,461,442 B2
APPLICATION NO. : 16/432558
DATED : October 4, 2022
INVENTOR(S) : Chen et al.

It is certified that error appears in the above-identified patent and that said Letters Patent is hereby corrected as shown below:

In the Claims

In Column 21, Line 57, Claim 1, the second instance of the word "a" should be deleted.

Signed and Sealed this
Tenth Day of January, 2023

Katherine Kelly Vidal
*Director of the United States Patent and Trademark Office*